(12) United States Patent
Teraoka

(10) Patent No.: US 10,871,635 B2
(45) Date of Patent: Dec. 22, 2020

(54) CAMERA LENS

(71) Applicant: AAC Acoustic Technologies (Shenzhen) Co., Ltd., Shenzhen (CN)

(72) Inventor: Hiroyuki Teraoka, Shenzhen (CN)

(73) Assignee: AAC Optics (Changzhou) Co., Ltd., Changzhou (CN)

( * ) Notice: Subject to any disclaimer, the term of this patent is extended or adjusted under 35 U.S.C. 154(b) by 93 days.

(21) Appl. No.: 16/236,539

(22) Filed: Dec. 30, 2018

(65) Prior Publication Data

US 2020/0026041 A1 Jan. 23, 2020

(30) Foreign Application Priority Data

Jul. 20, 2018 (JP) .................................. 2018-137213

(51) Int. Cl.
*G02B 9/00* (2006.01)
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC .............................. G02B 13/0045; G02B 9/64
See application file for complete search history.

(56) References Cited

U.S. PATENT DOCUMENTS 10,585,265 B2 * 3/2020 Jhang ................. G02B 13/0045

FOREIGN PATENT DOCUMENTS

CN 107703609 A * 2/2018 ............. G02B 13/06

* cited by examiner

*Primary Examiner* — Alicia M Harrington
(74) *Attorney, Agent, or Firm* — IPro, PLLC; Na Xu

(57) ABSTRACT

The present disclosure provides a camera lens, constituted by eight lenses, and featuring excellent optical characteristics, an ultra-thin appearance, a wide angle and a bright Fno. The camera lens is configured with, sequentially from an object side: a 1st lens having a positive refractive power, a 2nd lens having a negative refractive power, a 3rd lens having a negative refractive power, a 4th lens having a positive refractive power, a 5th lens having a negative refractive power, a 6th lens having a positive refractive power, a 7th lens having a positive refractive power and an 8th lens having a negative refractive power, and satisfies specified conditional formulas.

5 Claims, 13 Drawing Sheets

CAMERA LENS

CROSS-REFERENCE TO RELATED APPLICATIONS

This application claims the priority benefit of Japanese Patent Applications Ser. No. 2018-137213 and filed on Jul. 20, 2018, the entire content of which is incorporated herein by reference.

TECHNICAL FIELD

The present disclosure relates to the field of camera lenses, and more particularly, to a camera lens, which is constituted by eight lenses, is applicable to a mobile phone camera assembly, a WEB camera lens and the like using camera elements such as a high-pixel CCD and a CMOS, and meanwhile has an excellent optical characteristic, an ultra-thin appearance with total track length (TTL)/image height (IH)≤1.65, a wide angle with a field of view (hereinafter briefly referred to as 2ω) of 70° or more, and an F-number (hereinafter briefly referred to as Fno) of 1.45 or less.

BACKGROUND

In recent years, various types of camera devices using camera elements such as a CCD and a CMOS have been widely applied. With miniaturization and high performance-oriented development of these camera elements, the society has a stronger demand for a camera lens with excellent optical characteristics, an ultra-thin appearance, a wide-angle and a bright Fno.

A camera lens which is constituted by eight lenses and has a bright Fno is disclosed in the related art.

In the lens disclosed in related art, refractive powers of respective lenses from a 1st lens to an 8th lens are (positive, negative, positive, negative, positive, negative, negative, negative), (positive, negative, positive, negative, positive, positive, negative, negative), (positive, positive, negative, positive, negative, positive, negative negative), or (positive, positive, negative, positive, positive, positive, negative, negative), so Fno=1.20~1.60 which is bright, but TTL/IH>1.90 which is not ultra-thin enough.

DETAILED DESCRIPTION

Figure 1:
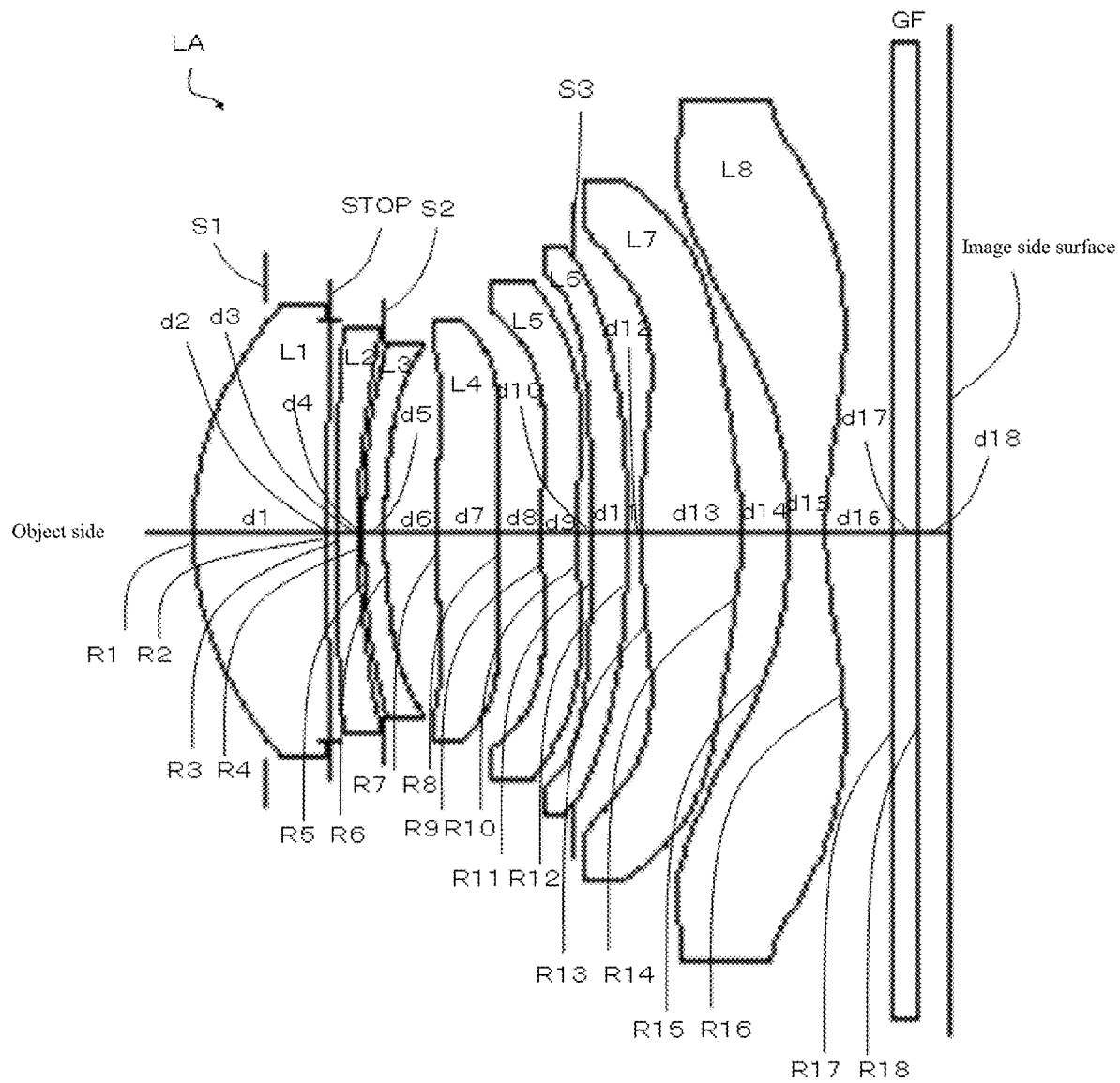
FIG. 1 is a diagram showing configuration of a camera lens LA according to an embodiment of the present disclosure.

An embodiment of a camera lens related to the present disclosure will be described with reference to the accompanying drawing. FIG. 1 is a diagram showing configuration of a camera lens according to an embodiment of the present disclosure. The camera lens LA is constituted by eight lens groups, and a 1st lens L1, a 2nd lens L2, a 3rd lens L3, a 4th lens L4, a 5th lens L5, a 6th lens L6, a 7th lens L7 and an 8th lens L8 are configured successively from an object side to an image side. A glass flat plate GF is provided between the 8th lens L8 and an image surface. The glass flat plate GF may be a glass cover sheet or an optical filter having an IR cut-off function. Or, the glass flat plate GF may not be provided between the 8th lens L8 and the image surface.

The 1st lens L1 has a positive refractive power, the 2nd lens L2 has a negative refractive power, the 3rd lens L3 has a negative refractive power, the 4th lens L4 has a positive refractive power, the 5th lens L5 has a negative refractive power, the 6th lens L6 has a positive refractive power, the 7th lens L7 has a positive refractive power, and the 8th lens L8 has a negative refractive power. In order to better correct an aberration problem, it is most preferable to design surfaces of the eight lenses as aspherical.

The camera lens LA is a camera lens that satisfies conditional formulas (1)-(2) below:

$$0.20 \leq R1/R2 \leq 0.50 \quad (1);$$

$$1.00 \leq R3/R4 \leq 1.40 \quad (2);$$

Where,

R1: a curvature radius of an object side surface of the 1st lens;

R2: a curvature radius of an image side surface of the 1st lens

R3: a curvature radius of an object side surface of the 2nd lens;

R4: a curvature radius of an image side surface of the 2nd lens.

The conditional formula (1) specifies the rate of the curvature radius R1 of an object side surface to the curvature radius R2 of an image side surface of the 1st lens L1. Outside a range of the conditional formula (1), it is difficult to correct an on-axis and off-axis color aberration with Fno≤1.45.

Here, it is most preferable to set a numerical range of the conditional formula (1) within a numerical range of a conditional formula (1-A) below:

$$0.30 \leq R1/R2 \leq 0.40 \tag{1-A}$$

The conditional formula (2) specifies the rate of the curvature radius R3 of an object side surface to the curvature radius R4 of an image side surface of the 2nd lens L2. Outside a range of the conditional formula (2), it is difficult to correct on-axis and off-axis color aberration with Fno≤1.45.

Here, it is most preferable to set a numerical range of the conditional formula (2) within a numerical range of a conditional formula (2-A) below:

$$1.30 \leq R3/R4 \leq 1.40 \tag{2-A}$$

The 1st lens L1 has a positive refractive power, and satisfies a conditional formula (3) below:

$$1.00 \leq f1/f \leq 1.50 \tag{3}$$

Where, f: a focal length of the overall camera lens;

f1: a focal length of the 1st lens.

The conditional formula (3) specifies a positive refractive power of the 1st lens L1. Outside a range of the conditional formula (3), it is difficult to develop toward ultra-thinness and wide-angle with Fno≤1.45.

Here, it is most preferable to set a numerical range of the conditional formula (3) within a numerical range of a conditional formula (3-A) below:

$$1.05 \leq f1/f \leq 1.20 \tag{3-A}$$

The 2nd lens L2 has a negative refractive power, and satisfies a conditional formula (4) below:

$$-8.00 \leq f2/f \leq -5.00 \tag{4}$$

Where, f: the focal length of the overall camera lens;

f2: a focal length of the 2nd lens.

The conditional formula (4) specifies a negative refractive power of the 2nd lens L2. Outside a range of the conditional formula (4), it is difficult to correct on-axis and off-axis color aberration with Fno≤1.45.

Here, it is most preferable to set a numerical range of the conditional formula (4) within a numerical range of a conditional formula (4-A) below:

$$-7.00 \leq f2/f \leq -6.00 \tag{4-A}$$

The 3rd lens L3 has a negative refractive power and satisfies a conditional formula (5) below:

$$-8.00 \leq f3/f \leq -5.00 \tag{5}$$

Where, f: the focal length of the overall camera lens;

f3: a focal length of the 3rd lens.

The conditional formula (5) specifies a negative refractive power of the 3rd lens L3. Outside a range of the conditional formula (5), it is difficult to correct on-axis and off-axis color aberration with Fno≤1.45.

Here, it is most preferable to set a numerical range of the conditional formula (5) within a numerical range of a conditional formula (5-A) below:

$$-7.00 \leq f3/f \leq -6.00 \tag{5-A}$$

The 7th lens L7 has a positive refractive power and satisfies a conditional formula (6) below:

$$-3.00 \leq R13/R14 \leq -1.00 \tag{6}$$

Where,

R13: a curvature radius of an object side surface of the 7th lens;

R14: a curvature radius of an image side surface of the 7th lens.

The conditional formula (6) specifies a ratio of the curvature radius R13 of the object side surface to the curvature radius R14 of the image side surface of the 7th lens L7. Outside a range of the conditional formula (6), it is difficult to correct on-axis and off-axis color aberration with Fno≤1.45.

Here, it is most preferable to set a numerical range of the conditional formula (6) within a numerical range of a conditional formula (6-A) below:

$$-2.20 \leq R13/R14 \leq -1.20 \tag{6-A}$$

The 8th lens L8 has a negative refractive power and satisfies a conditional formula (7) below:

$$-3.00 \leq R15/R16 \leq -1.00 \tag{7}$$

Where,

R15: a curvature radius of an object side surface of the 8th lens;

R16: a curvature radius of an image side surface of the 8th lens.

The conditional formula (7) specifies a ratio of the curvature radius of the object side surface R15 to the curvature radius of the image side surface R16 of the 8th lens L8. Outside a range of the conditional formula (7), it is difficult to correct on-axis and off-axis color aberration with Fno≤1.45.

Here, it is most preferable to set a numerical range of the conditional formula (7) within a numerical range of a conditional formula (7-A) below:

$$-2.60 \leq R15/R16 \leq -1.70 \tag{7-A}$$

The eight lenses constituting the camera lens LA respectively satisfy the configurations and the conditional formulas as described above, which makes it possible to fabricate the camera lens having an excellent optical characteristic, an ultra-thin appearance with total track length (TTL)/image height (IH)≤1.65, a wide angle with 2ω≥70°, and an Fno with Fno≤1.45.

Hereinafter, the camera lens LA according to the present disclosure will be described with embodiments. Symbols recited in the respective embodiments are shown below. Distance, radius and center thickness are in units of mm.

f: a focal length of the overall camera lens LA;

f1: a focal length of a 1st lens L1;

f2: a focal length of a 2nd lens L2;

f3: a focal length of a 3rd lens L3;

f4: a focal length of a 4th lens L4;

f5: a focal length of a 5th lens L5;

f6: a focal length of a 6th lens L6;

f7: a focal length of a 7th lens L7;

f8: a focal length of an 8th lens L8;
Fno: F number;
2ω: field of view;
STOP: open stop;
S1: stop 1;
S2: stop 2;
S3: stop 3;
R: a curvature radius of an optical surface, and a central curvature radius in a case of a lens;
R1: a curvature radius of an object side surface of the 1st lens L1;
R2: a curvature radius of an image side surface of the 1st lens L1;
R3: a curvature radius of an object side surface of the 2nd lens L2;
R4: a curvature radius of an image side surface of the 2nd lens L2;
R5: a curvature radius of an object side surface of the 3rd lens L3;
R6: a curvature radius of an image side surface of the 3rd lens L3;
R7: a curvature radius of an object side surface of the 4th lens L4;
R8: a curvature radius of an image side surface of the 4th lens L4;
R9: a curvature radius of an object side surface of the 5th lens L5;
R10: a curvature radius of an image side surface of the 5th lens L5;
R11: a curvature radius of an object side surface of the 6th lens L6;
R12: a curvature radius of an image side surface of the 6th lens L6;
R13: a curvature radius of an object side surface of the 7th lens L7;
R14: a curvature radius of an image side surface of the 7th lens L7;
R15: a curvature radius of an object side surface of the 8th lens L8;
R16: a curvature radius of an image side surface of the 8th lens L8;
R17: a curvature radius of an object side surface of the glass flat plate GF;
R18: a curvature radius of an image side surface of the glass flat plate GF;
d: a center thickness of a lens or an on-axis distance between lenses;
d1: a center thickness of the 1st lens L1;
d2: an on-axis distance from the image side surface of the 1st lens L1 to the object side surface of the 2nd lens L2;
d3: a center thickness of the 2nd lens L2;
d4: an on-axis distance from the image side surface of the 2nd lens L2 to the object side surface of the 3rd lens L3;
d5: a center thickness of the 3rd lens L3;
d6: an on-axis distance from the image side surface of the 3rd lens L3 to the object side surface of the 4th lens L4;
d7: a center thickness of the 4th lens L4;
d8: an on-axis distance from the image side surface of the 4th lens L4 to the object side surface of the 5th lens L5;
d9: a center thickness of the 5th lens L5;
d10: an on-axis distance from the image side surface of the 5th lens L5 to the object side surface of the 6th lens L6;
d11: a center thickness of the 6th lens L6;
d12: an on-axis distance from the image side surface of the 6th lens L6 to the object side surface of the 7th lens L7;
d13: a center thickness of the 7th lens L7;
d14: an on-axis distance from the image side surface of the 7th lens L7 to the object side surface of the 8th lens L8;
d15: a center thickness of the 8th lens L8;
d16: an on-axis distance from the image side surface of the 8th lens L8 to the object side surface of the glass flat plate GF;
d17: a center thickness of the glass flat plate GF;
d18: an on-axis distance from the image side surface of the glass flat plate GF to an image surface;
nd: a refractive index of d line;
nd1: a refractive index of d line of the 1st lens L1;
nd2: a refractive index of d line of the 2nd lens L2;
nd3: a refractive index of d line of the 3rd lens L3;
nd4: a refractive index of d line of the 4th lens L4;
nd5: a refractive index of d line of the 5th lens L5;
nd6: a refractive index of d line of the 6th lens L6;
nd7: a refractive index of d line of the 7th lens L7;
nd8: a refractive index of d line of the 8th lens L8;
nd9: a refractive index of d line of the glass flat plate GF;
ν: Abbe number;
ν1: Abbe number of the 1st lens L1;
ν2: Abbe number of the 2nd lens L2;
ν3: Abbe number of the 3rd lens L3;
ν4: Abbe number of the 4th lens L4;
ν5: Abbe number of the 5th lens L5;
ν6: Abbe number of the 6th lens L6;
ν7: Abbe number of the 7th lens L7;
ν8: Abbe number of the 8th lens L8;
ν9: Abbe number of the glass flat plate GF;
TTL: a total track length (an on-axis distance from the object side surface of the 1st lens L1 to the image surface);
LB: an on-axis distance from the image side surface of the 8th lens L8 to the image surface (including a thickness of the glass flat plate GF).
IH: Image Height $$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16} \qquad (8)$$

For the sake of convenience, the aspherical surface shown in formula (8) is taken as aspheric surfaces of respective lens surfaces. However, the present disclosure is not limited to an aspherical polynomial form expressed by formula (8).

Embodiment 1

Figure 2:
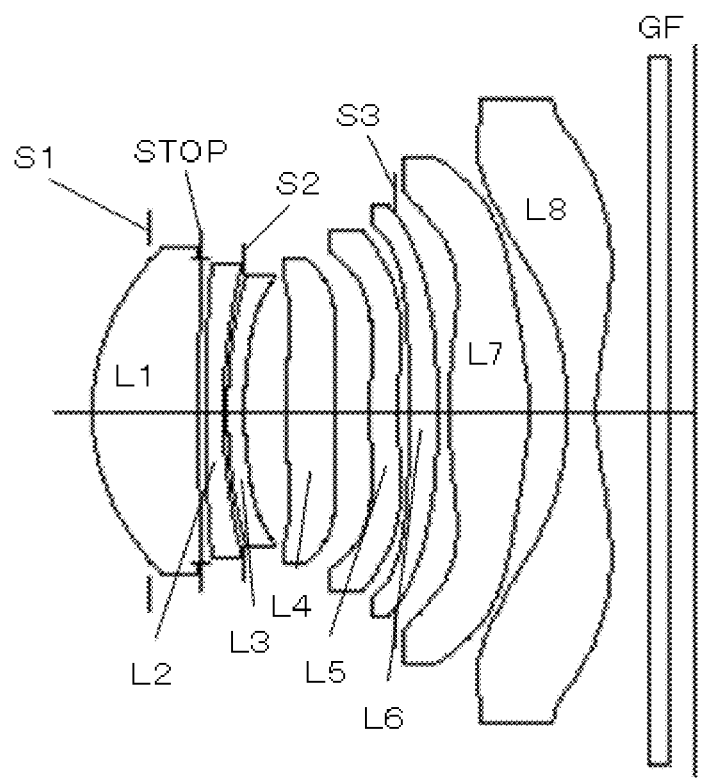
FIG. 2 is a diagram showing configuration of a specific Embodiment 1 of the camera lens LA.

FIG. 2 is a diagram showing configuration of a camera lens LA according to Embodiment 1. Data in Table 1 includes: curvature radius R of object sides and image sides, center thickness of a lens and on-axis distance d between lenses, refractive index nd, Abbe number νd and effective radius of a 1st lens L1 to an 8th lens L8 constituting the camera lens LA according to Embodiment 1. Data in Table 2 includes: conic coefficient k and aspherical coefficient. Data in Table 3 includes: 2ω, f, f1, f2, f3, f4, f5, f6, f7, f8, TTL, IH and TTL/IH.

TABLE 1

|  | R (mm) | d (mm) |  | nd |  | vd | Effective radius (mm) |
| --- | --- | --- | --- | --- | --- | --- | --- |
| S1 | ∞ |  | −0.600 |  |  |  | 1.800 |
| R1 | 2.3242 | d1 | 1.105 | nd1 | 1.5831 | v1 59.39 | 1.780 |
| R2 | 7.1205 | d2 | 0.045 |  |  |  | 1.667 |
| STOP | ∞ |  | 0.049 |  |  |  | 1.653 |
| R3 | 7.4847 | d3 | 0.186 | nd2 | 1.6613 | v2 20.37 | 1.583 |
| R4 | 5.5774 | d4 | 0.205 |  |  |  | 1.475 |
| S2 | ∞ |  | −0.160 |  |  |  | 1.460 |
| R5 | 5.5740 | d5 | 0.180 | nd3 | 1.6509 | v3 21.52 | 1.462 |
| R6 | 4.3500 | d6 | 0.441 |  |  |  | 1.432 |
| R7 | 6.9834 | d7 | 0.517 | nd4 | 1.5439 | v4 55.95 | 1.490 |
| R8 | 10.1662 | d8 | 0.367 |  |  |  | 1.635 |
| R9 | 4.7548 | d9 | 0.292 | nd5 | 1.6397 | v5 23.53 | 1.706 |
| R10 | 3.6307 | d10 | 0.129 |  |  |  | 1.951 |
| R11 | −13.3965 | d11 | 0.298 | nd6 | 1.5439 | v6 55.95 | 2.026 |
| R12 | −8.8321 | d12 | −0.450 |  |  |  | 2.222 |
| S3 | ∞ |  | 0.568 |  |  |  | 2.240 |
| R13 | 5.3062 | d13 | 0.844 | nd7 | 1.5439 | v7 55.95 | 2.380 |
| R14 | −2.9560 | d14 | 0.399 |  |  |  | 2.727 |
| R15 | −4.7717 | d15 | 0.309 | nd8 | 1.5352 | v8 56.12 | 3.107 |
| R16 | 2.3786 | d16 | 0.550 |  |  |  | 3.353 |
| R17 | ∞ | d17 | 0.210 | nd9 | 1.5168 | v9 64.17 | 3.766 |
| R18 | ∞ | d18 | 0.295 |  |  |  | 3.820 |

TABLE 2

|  | Conic coefficient | Aspheric coefficient | | | | | | |
| --- | --- | --- | --- | --- | --- | --- | --- | --- |
|  | k | A4 | A6 | A8 | A10 | A12 | A14 | A16 |
| R1 | −3.2014E−01 | −1.4544E−04 | 4.4451E−03 | −4.6724E−03 | 2.8111E−03 | −9.7712E−04 | 1.8345E−04 | −1.9466E−05 |
| R2 | 5.5575E+00 | −6.2816E−02 | 3.0919E−02 | −3.1238E−03 | −4.4264E−03 | 1.8821E−03 | −2.7609E−04 | 9.4175E−06 |
| R3 | 8.6375E+00 | −8.6818E−02 | 5.5014E−02 | −8.0669E−03 | −7.6374E−03 | 4.2109E−03 | −7.3769E−04 | 3.8810E−05 |
| R4 | −3.2543E+00 | −1.2413E−03 | −1.2393E−03 | −6.8674E−04 | −1.1030E−06 | 1.0007E−04 | 4.2387E−05 | −2.0060E−06 |
| R5 | 4.8405E−03 | 3.5462E−05 | −3.3023E−05 | 2.2901E−04 | 5.9860E−05 | −3.1933E−05 | −2.4337E−05 | 7.1251E−06 |
| R6 | 6.5289E+00 | −4.3685E−02 | 3.3245E−02 | −1.8013E−02 | −7.5919E−03 | 3.8888E−03 | −4.5261E−04 | −6.5739E−05 |
| R7 | −4.7158E+01 | −2.3374E−02 | −5.2733E−03 | 1.2948E−02 | −2.3619E−02 | 1.9421E−02 | −7.7925E−03 | 1.2296E−03 |
| R8 | −6.0793E+00 | −5.1653E−02 | 1.6297E−02 | −1.2290E−02 | 2.3545E−03 | 1.5183E−04 | −1.5804E−04 | 1.3738E−05 |
| R9 | −2.8029E+01 | −1.0704E−01 | 4.1998E−02 | −1.8052E−02 | 5.8877E−03 | −2.3582E−03 | 7.0293E−04 | −9.6023E−05 |
| R10 | −2.7076E+01 | −8.5543E−02 | 1.5527E−02 | 2.7086E−03 | −3.7215E−03 | 1.3740E−03 | −2.4953E−04 | 1.9721E−05 |
| R11 | −4.0424E+01 | 1.1716E−03 | −6.6739E−04 | −4.4876E−04 | −1.3996E−04 | −8.7495E−06 | 2.1526E−07 | 1.0644E−06 |
| R12 | 1.0895E+01 | −3.1866E−03 | −3.4863E−04 | −8.1124E−05 | −1.8738E−05 | 2.4336E−06 | 5.9661E−08 | 2.3225E−07 |
| R13 | −1.9509E+01 | −2.0832E−03 | −1.3915E−02 | 5.5677E−03 | −2.0363E−03 | 4.5795E−04 | −5.4068E−05 | 2.7476E−06 |
| R14 | −1.7258E+01 | 1.0684E−02 | 2.2332E−03 | −2.9683E−03 | 7.0165E−04 | −8.0554E−05 | 4.4206E−06 | −8.4147E−08 |
| R15 | −7.9357E−01 | −5.6471E−02 | 1.9904E−02 | −3.5459E−03 | 4.0698E−04 | −2.8632E−05 | 1.1181E−06 | −1.8720E−08 |
| R16 | −1.4273E+01 | −3.5512E−02 | 9.3180E−03 | −1.7842E−03 | 1.9824E−04 | −1.2579E−05 | 4.2838E−07 | −5.4688E−09 |

TABLE 3

| 2ω (°) | 73.6 |
| --- | --- |
| Fno | 1.27 |
| f (mm) | 5.162 |
| f1 (mm) | 5.455 |
| f2 (mm) | −34.467 |
| f3 (mm) | −32.337 |
| f4 (mm) | 38.791 |
| f5 (mm) | −26.735 |
| f6 (mm) | 46.588 |
| f7 (mm) | 3.621 |
| f8 (mm) | −2.925 |
| TTL (mm) | 6.380 |
| LB (mm) | 1.055 |
| IH (mm) | 3.928 |
| TTL/IH | 1.624 |

Table 19 presented later on shows a variety of numerical of each of Embodiment 1 to Embodiment 6 and values corresponding to parameters specified in the conditional formulas (1) to (7).

As shown in Table 19, Embodiment 1 satisfies the conditional formulas (1) to (7).

Figure 3:
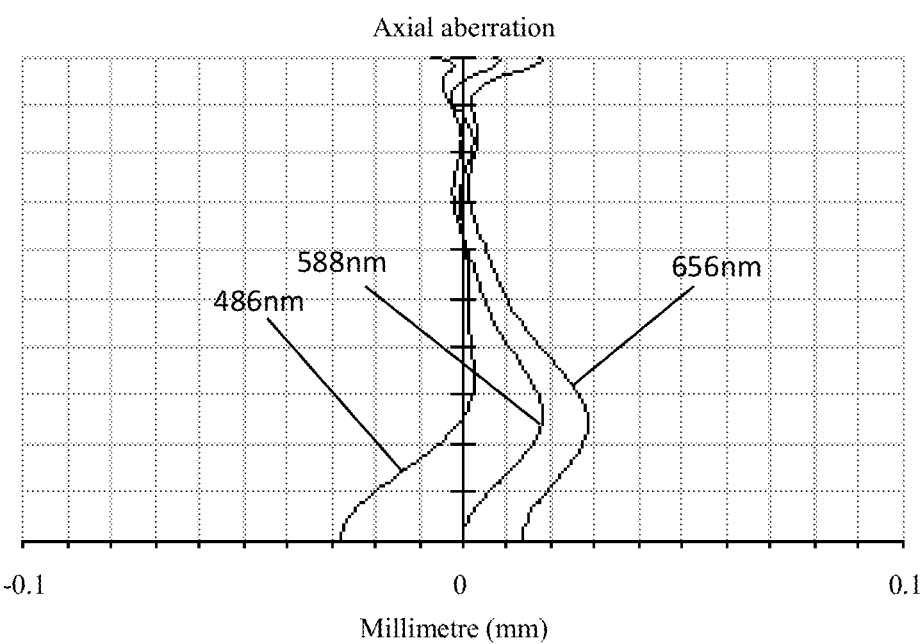
FIG. 3 is an axial aberration diagram of the camera lens LA according to Embodiment 1.
Figure 4:
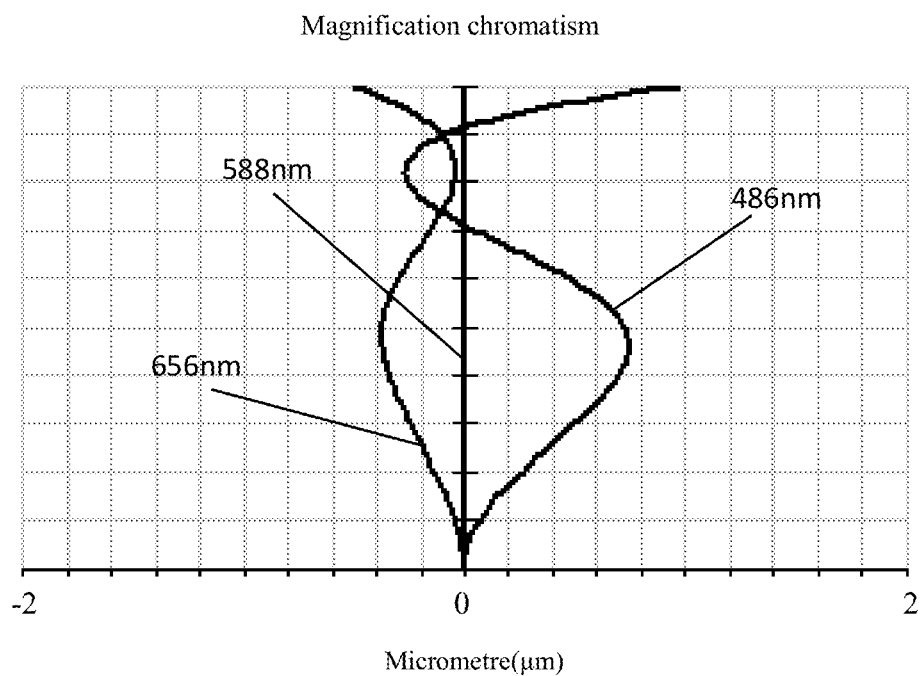
FIG. 4 is a magnification chromatism diagram of the camera lens LA according to the Embodiment 1.
Figure 5:
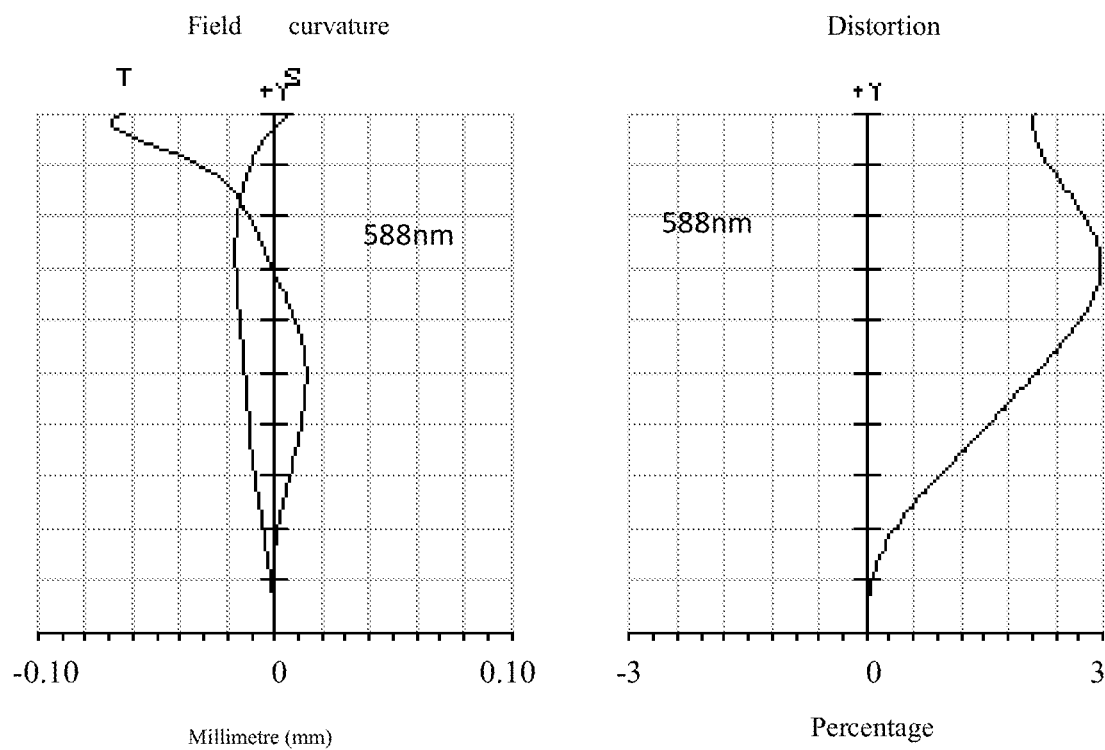
FIG. 5 is a field curvature and distortion diagram of the camera lens LA according to Embodiment 1.

According to the camera lens LA of Embodiment 1, axial aberration is shown in FIG. 3, magnification chromatism is shown in FIG. 4, and field curvature and distortion is shown in FIG. 5. Further, field curvature S of FIG. 5 is a field curvature opposite to a sagittal image surface, and T is a field curvature opposite to a meridional image surface. So are they in Embodiments 2 to 6. As shown in Table 3, the camera lens LA according to Embodiment 1 has a wide angle, an ultra-thin appearance, and a bright Fno, as shown in FIG. 3 to FIG. 5, which makes it not difficult to understand that it has an excellent optical characteristic.

Embodiment 2

Figure 6:
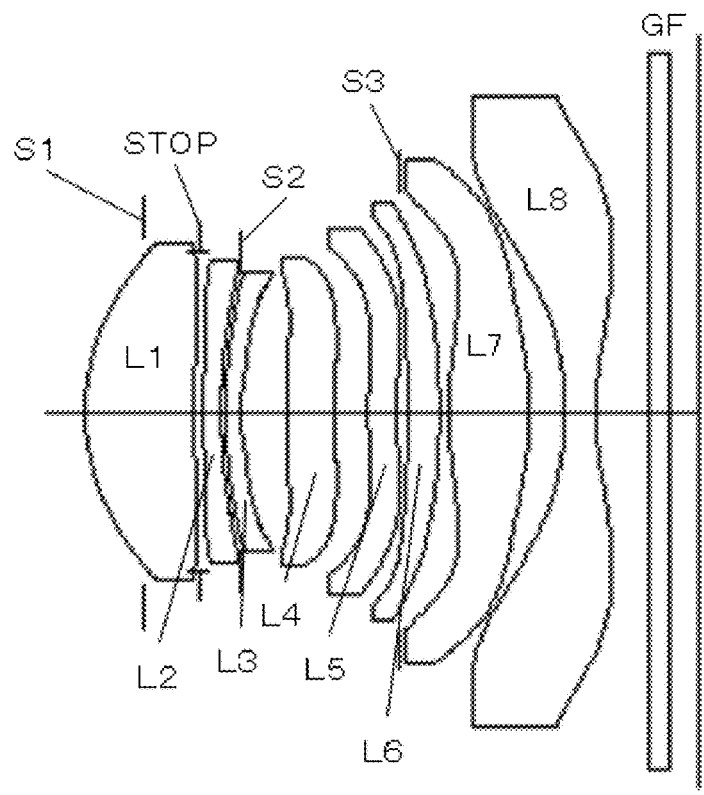
FIG. 6 is a diagram showing configuration of a specific Embodiment 2 of the camera lens LA.
Figure 8:
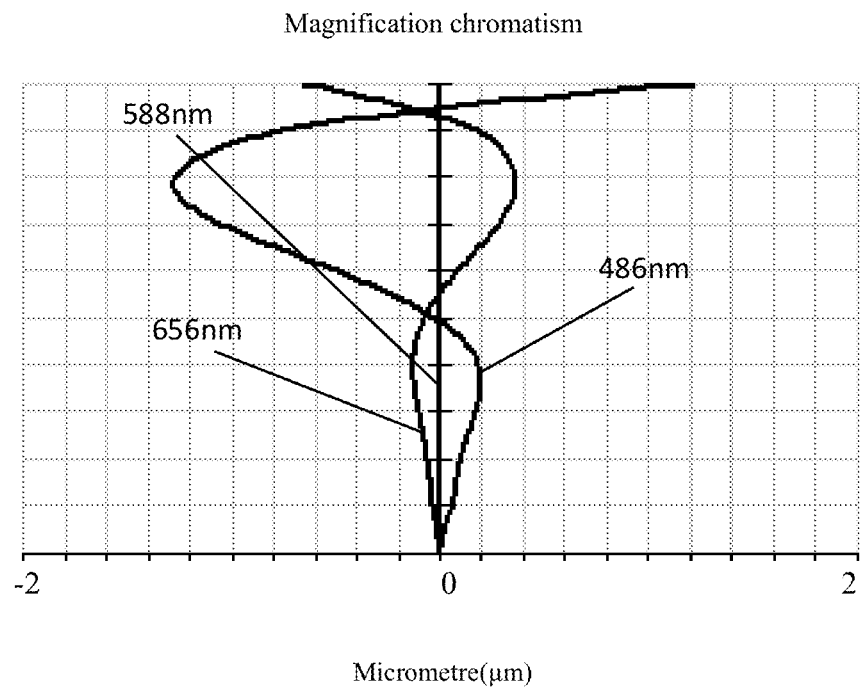
FIG. 8 is a magnification chromatism diagram of the camera lens LA according to Embodiment 2.
Figure 9:
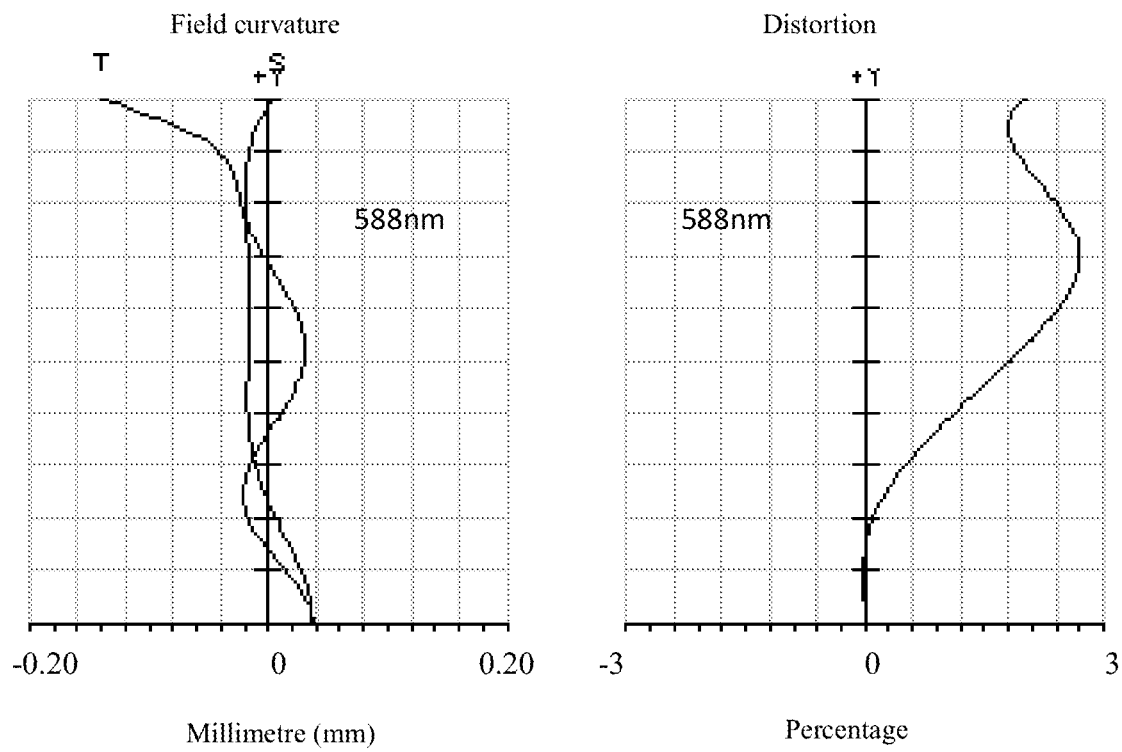
FIG. 9 is a field curvature and distortion diagram of the camera lens LA according to Embodiment 2.

FIG. 6 is a diagram showing configuration of a camera lens LA according to Embodiment 2. Data in Table 4 includes: curvature radius R of object sides and image sides, center thickness of a lens, and on-axis distance d between lenses, refractive index nd, Abbe number vd and effective radius of a 1st lens L1 to an 8th lens L8 constituting the camera lens LA according to Embodiment 2. Data in Table 5 includes: conic coefficient k and aspherical coefficient. Data in Table 6 includes: 2ω, f, f1, f2, f3, f4, f5, f6, f7, f8, TTL, IH and TTL/IH.

shown in FIG. 8, and field curvature and distortion is shown in FIG. 9. As shown in Table 6, the camera lens LA according to Embodiment 2 has a wide angle, an ultra-thin

TABLE 4

|  | R (mm) | d (mm) |  | nd |  | vd | Effective radius (mm) |
|---|---|---|---|---|---|---|---|
| S1 | ∞ | −0.600 |  |  |  |  | 1.800 |
| R1 | 2.3562 | d1 1.121 | nd1 | 1.5831 | v1 | 59.39 | 1.790 |
| R2 | 7.4516 | d2 0.053 |  |  |  |  | 1.708 |
| STOP | ∞ | 0.044 |  |  |  |  | 1.679 |
| R3 | 7.6478 | d3 0.184 | nd2 | 1.6613 | v2 | 20.37 | 1.609 |
| R4 | 5.6617 | d4 0.219 |  |  |  |  | 1.490 |
| S2 | ∞ | −0.170 |  |  |  |  | 1.470 |
| R5 | 5.6075 | d5 0.180 | nd3 | 1.6509 | v3 | 21.52 | 1.471 |
| R6 | 4.3616 | d6 0.447 |  |  |  |  | 1.452 |
| R7 | 7.0869 | d7 0.504 | nd4 | 1.5439 | v4 | 55.95 | 1.502 |
| R8 | 9.9430 | d8 0.341 |  |  |  |  | 1.631 |
| R9 | 4.3691 | d9 0.288 | nd5 | 1.6397 | v5 | 23.53 | 1.707 |
| R10 | 3.1310 | d10 0.122 |  |  |  |  | 1.935 |
| R11 | −12.5054 | d11 0.325 | nd6 | 1.5439 | v6 | 55.95 | 2.043 |
| R12 | −8.2593 | d12 −0.400 |  |  |  |  | 2.207 |
| S3 | ∞ | 0.497 |  |  |  |  | 2.300 |
| R13 | 3.8772 | d13 0.836 | nd7 | 1.5439 | v7 | 55.95 | 2.337 |
| R14 | −3.0399 | d14 0.360 |  |  |  |  | 2.659 |
| R15 | −4.4823 | d15 0.314 | nd8 | 1.5352 | v8 | 56.12 | 3.027 |
| R16 | 2.4170 | d16 0.550 |  |  |  |  | 3.335 |
| R17 | ∞ | d17 0.210 | nd9 | 1.5168 | v9 | 64.17 | 3.738 |
| R18 | ∞ | d18 0.317 |  |  |  |  | 3.795 |

TABLE 5

|  | Conic coefficient | Aspheric coefficient | | | | | | |
|---|---|---|---|---|---|---|---|---|
|  | k | A4 | A6 | A8 | A10 | A12 | A14 | A16 |
| R1 | −3.2216E−01 | −9.7789E−05 | 4.4153E−03 | −4.7015E−03 | 2.8077E−03 | −9.7356E−04 | 1.8444E−04 | −1.9562E−05 |
| R2 | 5.7097E+00 | −6.2722E−02 | 3.0842E−02 | −3.1540E−03 | −4.4346E−03 | 1.8842E−03 | −2.7511E−04 | 9.5330E−06 |
| R3 | 8.6335E+00 | −8.7229E−02 | 5.5087E−02 | −8.0412E−03 | −7.6378E−03 | 4.1999E−03 | −7.3939E−04 | 4.0958E−05 |
| R4 | −3.9933E+00 | −1.2684E−03 | −1.1423E−03 | −7.0368E−04 | −8.8672E−06 | 1.0845E−04 | 4.6015E−05 | 5.4879E−07 |
| R5 | −1.5771E+00 | −9.6436E−04 | −5.6161E−04 | 3.6493E−05 | 7.0541E−05 | −9.3873E−06 | −2.0916E−05 | 4.6118E−06 |
| R6 | 6.2493E+00 | −4.5508E−02 | 3.2984E−02 | −1.6945E−03 | −7.6043E−03 | 3.8378E−03 | −4.6940E−04 | −5.6367E−05 |
| R7 | −5.4823E+01 | −2.2949E−02 | −5.3848E−03 | 1.2632E−03 | −2.3675E−02 | 1.9507E−02 | −7.7619E−03 | 1.2048E−03 |
| R8 | −1.9084E+00 | −5.1188E−02 | 1.5785E−02 | −1.2356E−02 | 2.3553E−03 | 1.3284E−04 | −1.6479E−04 | 1.7633E−05 |
| R9 | −3.7963E+01 | −1.0563E−01 | 4.3064E−02 | −1.8104E−02 | 5.7359E−03 | −2.3666E−03 | 7.1084E−04 | −9.1357E−05 |
| R10 | −3.6227E+01 | −8.6624E−02 | 1.5836E−02 | 2.7993E−03 | −3.7310E−03 | 1.3651E−03 | −2.5008E−04 | 2.0537E−05 |
| R11 | −7.0816E+01 | 2.6344E−03 | −1.9215E−04 | −4.5418E−04 | −1.5565E−04 | −1.0852E−05 | 2.7177E−07 | 1.3950E−06 |
| R12 | 9.8526E+00 | −2.7804E−03 | −1.5696E−04 | −6.1795E−05 | −2.3670E−05 | 6.9610E−07 | 5.9274E−08 | 2.7480E−07 |
| R13 | −2.5120E+01 | −1.0275E−03 | −1.4235E−02 | 5.5368E−03 | −2.0339E−03 | 4.5811E−04 | −5.4036E−05 | 2.7395E−06 |
| R14 | −1.2606E+01 | 1.1061E−02 | 2.3137E−03 | −3.0177E−03 | 7.0024E−04 | −8.0346E−05 | 4.4460E−06 | −8.5562E−08 |
| R15 | −8.8444E−01 | −5.6416E−02 | 1.9948E−02 | −3.5432E−03 | 4.0708E−04 | −2.8637E−05 | 1.1159E−06 | −1.8720E−08 |
| R16 | −1.2022E+01 | −3.4824E−02 | 9.2426E−03 | −1.7839E−03 | 1.9850E−04 | −1.2565E−05 | 4.2757E−07 | −5.5695E−09 |

TABLE 6

| 2ω (°) | 75.1 |
|---|---|
| Fno | 1.23 |
| f (mm) | 5.086 |
| f1 (mm) | 5.466 |
| f2 (mm) | −34.263 |
| f3 (mm) | −32.009 |
| f4 (mm) | 42.709 |
| f5 (mm) | −19.014 |
| f6 (mm) | 43.550 |
| f7 (mm) | 3.272 |
| f8 (mm) | −2.891 |
| TTL (mm) | 6.341 |
| LB (mm) | 1.077 |
| IH (mm) | 3.928 |
| TTL/IH | 1.614 |

As shown in Table 19, Embodiment 2 satisfies the conditional formulas (1) to (7).

Figure 7:
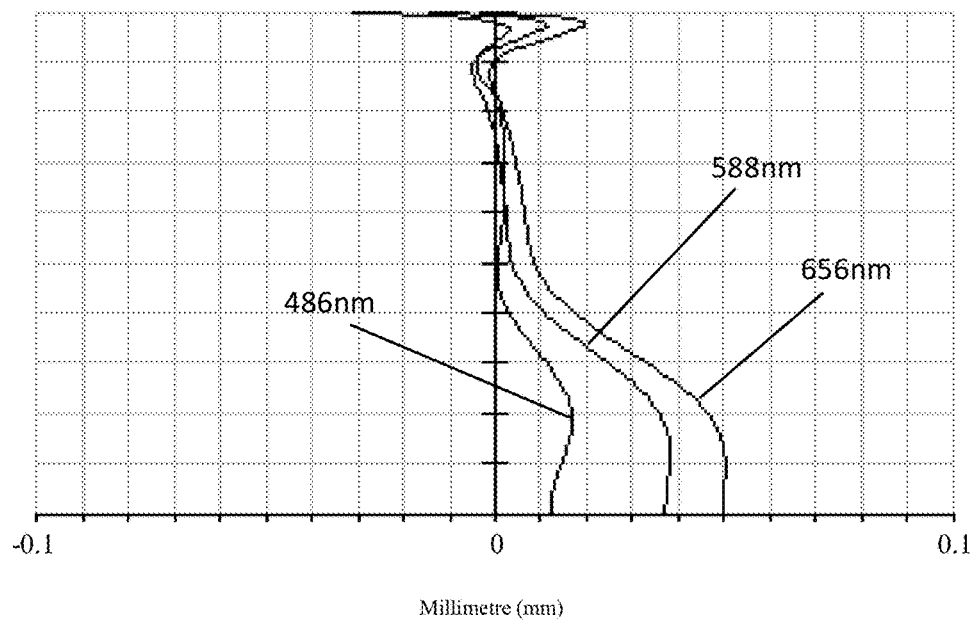
FIG. 7 is an axial aberration diagram of the camera lens LA according to Embodiment 2.

According to the camera lens LA of Embodiment 2, axial aberration is shown in FIG. 7, magnification chromatism is shown in FIG. 8, and field curvature and distortion is shown in FIG. 9. As shown in Table 6, the camera lens LA according to Embodiment 2 has a wide angle, an ultra-thin appearance and a bright Fno, as shown in FIG. 7 to FIG. 9, which makes it not difficult to understand that it has an excellent optical characteristic.

Embodiment 3

Figure 10:
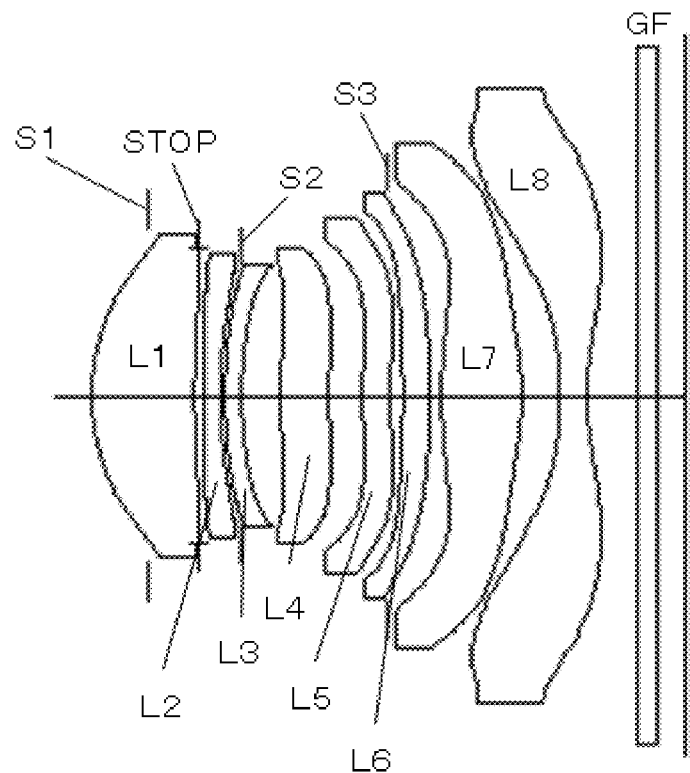
FIG. 10 is a diagram showing configuration of a specific Embodiment 3 of the above-described camera lens LA.

FIG. 10 is a diagram showing configuration of a camera lens LA according to Embodiment 3. Data in Table 7 includes: curvature radius R of object sides and image sides, center thickness of a lens and on-axis distance d between lenses, refractive index nd, Abbe number vd and effective radius of a 1st lens L1 to an 8th lens L8 constituting the camera lens LA according to Embodiment 3. Data in Table 8 includes: conic coefficient k and aspherical coefficient. Data in Table 9 includes: 2ω, f, f1, f2, f3, f4, f5, f6, f7, f8, TTL, IH and TTL/IH.

TABLE 7

|  | R (mm) | d (mm) |  | nd |  | vd | Effective radius (mm) |
|---|---|---|---|---|---|---|---|
| S1 | ∞ | −0.600 |  |  |  |  | 1.800 |
| R1 | 2.3264 | d1 1.098 | nd1 | 1.5831 | v1 | 59.39 | 1.770 |
| R2 | 7.1031 | d2 0.055 |  |  |  |  | 1.642 |
| STOP | ∞ | 0.039 |  |  |  |  | 1.624 |
| R3 | 7.5207 | d3 0.187 | nd2 | 1.6613 | v2 | 20.37 | 1.565 |
| R4 | 5.5761 | d4 0.209 |  |  |  |  | 1.458 |
| S2 | ∞ | −0.160 |  |  |  |  | 1.440 |
| R5 | 5.5775 | d5 0.180 | nd3 | 1.6509 | v3 | 21.52 | 1.443 |
| R6 | 4.3452 | d6 0.420 |  |  |  |  | 1.418 |
| R7 | 7.0004 | d7 0.520 | nd4 | 1.5439 | v4 | 55.95 | 1.474 |
| R8 | 10.1124 | d8 0.359 |  |  |  |  | 1.627 |
| R9 | 4.7362 | d9 0.293 | nd5 | 1.6397 | v5 | 23.53 | 1.701 |
| R10 | 3.6338 | d10 0.139 |  |  |  |  | 1.946 |
| R11 | −13.6377 | d11 0.296 | nd6 | 1.5439 | v6 | 55.95 | 2.018 |
| R12 | −8.7437 | d12 −0.450 |  |  |  |  | 2.213 |
| S3 | ∞ | 0.569 |  |  |  |  | 2.240 |
| R13 | 5.2988 | d13 0.865 | nd7 | 1.5439 | v7 | 55.95 | 2.379 |
| R14 | −2.9228 | d14 0.409 |  |  |  |  | 2.762 |
| R15 | −4.7340 | d15 0.285 | nd8 | 1.5352 | v8 | 56.12 | 3.180 |
| R16 | 2.3556 | d16 0.550 |  |  |  |  | 3.366 |
| R17 | ∞ | d17 0.210 | nd9 | 1.5168 | v9 | 64.17 | 3.772 |
| R18 | ∞ | d18 0.308 |  |  |  |  | 3.825 |

TABLE 8

| | Conic coefficient | Aspheric coefficient | | | | | | |
|---|---|---|---|---|---|---|---|---|
| | k | A4 | A6 | A8 | A10 | A12 | A14 | A16 |
| R1 | −3.1784E−01 | −1.3784E−04 | 4.4795E−03 | −4.6697E−03 | 2.8100E−03 | −9.7735E−04 | 1.8357E−04 | −1.9327E−05 |
| R2 | 5.6279E+00 | −6.2798E−02 | 3.0944E−02 | −3.1145E−03 | −4.4255E−03 | 1.8818E−03 | −2.7608E−04 | 9.5882E−06 |
| R3 | 8.4979E+00 | −8.6860E−02 | 5.4970E−02 | −8.0870E−03 | −7.6404E−03 | 4.2116E−03 | −7.3727E−04 | 3.8690E−05 |
| R4 | −3.4170E+00 | −1.3327E−03 | −1.2655E−03 | −6.8259E−04 | −1.0649E−06 | 9.8043E−05 | 4.1237E−05 | −2.1251E−06 |
| R5 | 2.4192E−01 | 2.2351E−04 | 2.9103E−05 | 2.2678E−04 | 5.5580E−05 | −3.2582E−05 | −2.3998E−05 | 7.1983E−06 |
| R6 | 6.5477E+00 | −4.3781E−02 | 3.3163E−02 | −1.7966E−03 | −7.5814E−03 | 3.8919E−03 | −4.5311E−04 | −6.6769E−05 |
| R7 | −4.9447E+01 | −2.3312E−02 | −5.2008E−03 | 1.2950E−02 | −2.3634E−02 | 1.9412E−02 | −7.7921E−03 | 1.2341E−03 |
| R8 | −5.5782E+00 | −5.1590E−02 | 1.6319E−02 | −1.2293E−02 | 2.3520E−03 | 1.5220E−04 | −1.5810E−04 | 1.3003E−05 |
| R9 | −2.7515E+01 | −1.0709E−01 | 4.1922E−02 | −1.8031E−02 | 5.9134E−03 | −2.3494E−03 | 7.0324E−04 | −9.7362E−05 |
| R10 | −2.6179E+01 | −8.5438E−02 | 1.5529E−02 | 2.7107E−03 | −3.7187E−03 | 1.3751E−03 | −2.4949E−04 | 1.9553E−05 |
| R11 | −4.6409E+01 | 1.1335E−03 | −7.6145E−04 | −4.6049E−04 | −1.3787E−04 | −7.4113E−06 | 1.6844E−07 | 8.6313E−07 |
| R12 | 1.1214E+01 | −3.3491E−03 | −3.5839E−04 | −7.6728E−05 | −1.7137E−05 | 2.6747E−06 | 5.5881E−08 | 2.2055E−07 |
| R13 | −1.7531E+01 | −2.0831E−03 | −1.3907E−02 | 5.5665E−03 | −2.0370E−03 | 4.5785E−04 | −5.4076E−05 | 2.7476E−06 |
| R14 | −1.7768E+01 | 1.1139E−02 | 2.2786E−03 | −2.9650E−03 | 7.0140E−04 | −8.0598E−05 | 4.4229E−06 | −8.2427E−08 |
| R15 | −8.3041E−01 | −5.6416E−02 | 1.9901E−02 | −3.5460E−03 | 4.0700E−04 | −2.8628E−05 | 1.1184E−06 | −1.8708E−08 |
| R16 | −1.4663E+01 | −3.5937E−02 | 9.3339E−03 | −1.7833E−03 | 1.9825E−04 | −1.2578E−05 | 4.2864E−07 | −5.4289E−09 |

TABLE 9

| 2ω (°) | 73.5 |
|---|---|
| Fno | 1.29 |
| f (mm) | 5.156 |
| f1 (mm) | 5.470 |
| f2 (mm) | −33.943 |
| f3 (mm) | −32.091 |
| f4 (mm) | 39.497 |
| f5 (mm) | −27.254 |
| f6 (mm) | 43.863 |
| f7 (mm) | 3.597 |
| f8 (mm) | −2.901 |
| TTL (mm) | 6.380 |
| LB (mm) | 1.068 |
| IH (mm) | 3.928 |
| TTL/IH | 1.624 |

As shown in Table 19, Embodiment 3 satisfies the conditional formulas (1) to (7).

Figure 11:
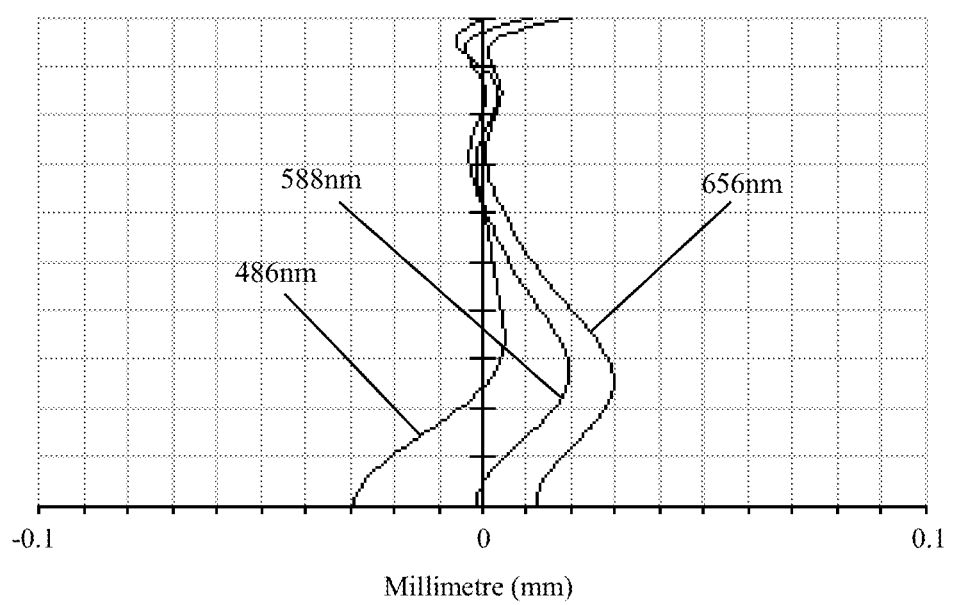
FIG. 11 is an axial aberration diagram of the camera lens LA according to Embodiment 3.
Figure 12:
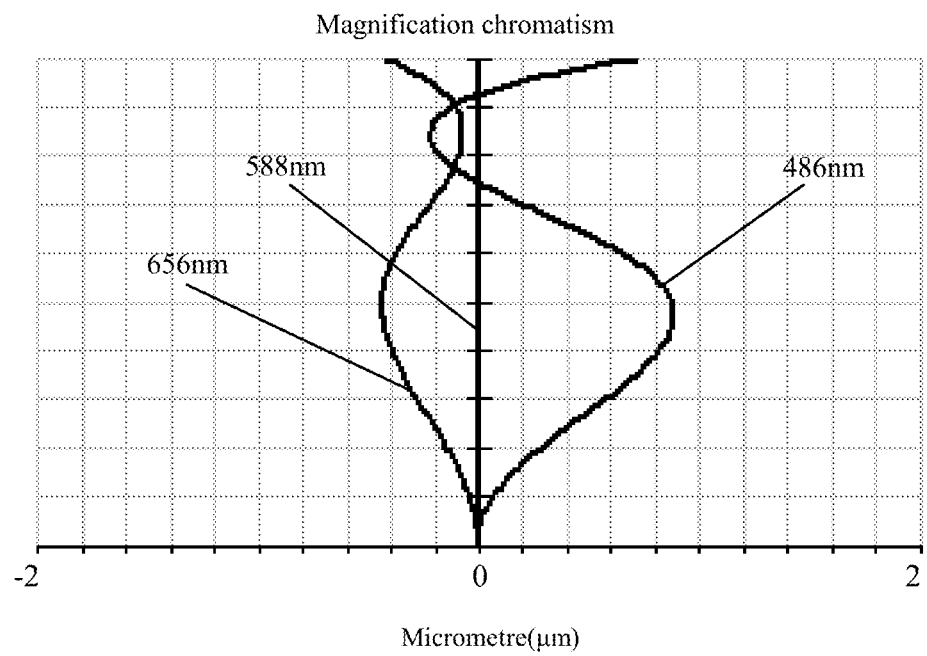
FIG. 12 is a magnification chromatism diagram of the camera lens LA according to Embodiment 3.
Figure 13:
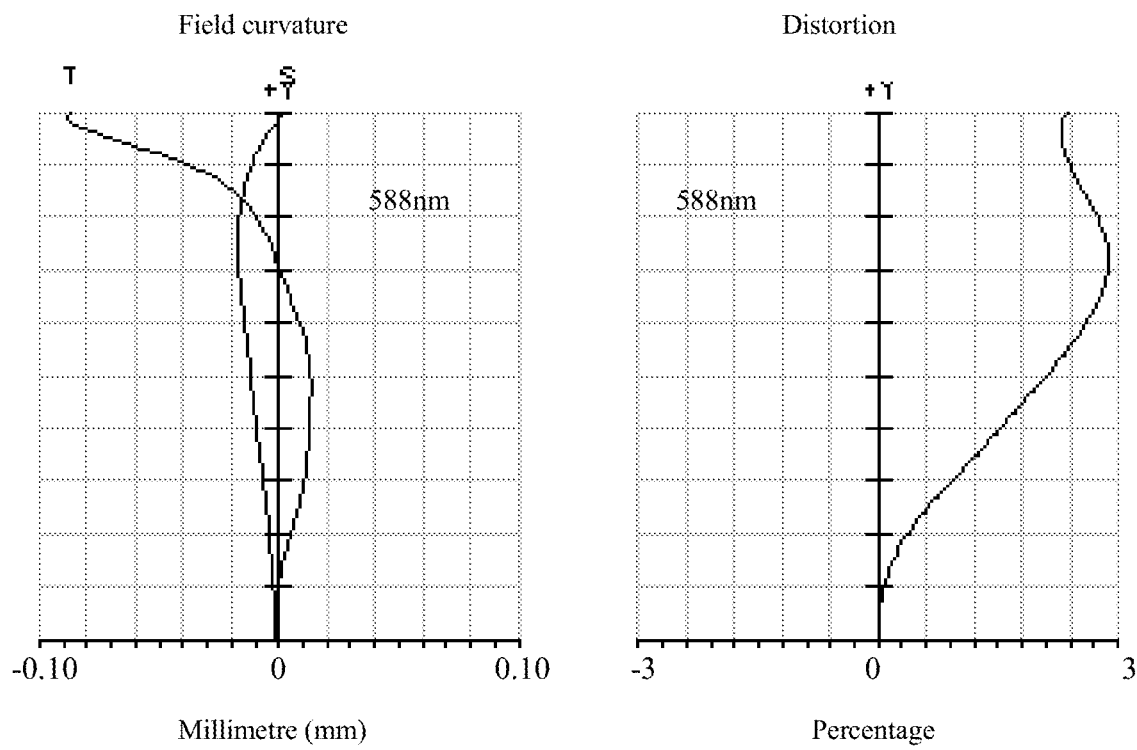
FIG. 13 is a field curvature and distortion diagram of the camera lens LA according to Embodiment 3.

According to the camera lens LA of Embodiment 3, axial aberration is shown in FIG. 11, magnification chromatism is shown in FIG. 12, and field curvature and distortion is shown in FIG. 13. As shown in Table 9, the camera lens LA according to Embodiment 3 has a wide angle, an ultra-thin appearance and a bright Fno, as shown in FIG. 11 to FIG. 13, which makes it not difficult to understand that it has an excellent optical characteristic.

Embodiment 4

Figure 14:
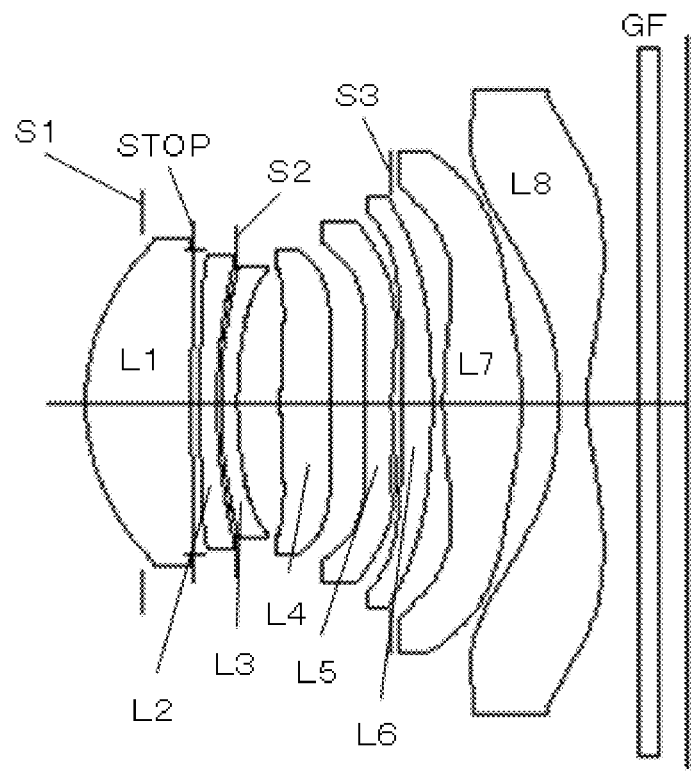
FIG. 14 is a diagram showing configuration of a specific Embodiment 4 of the camera lens LA.

FIG. 14 is a diagram showing configuration of a camera lens LA according to Embodiment 4. Data in Table 10 includes: curvature radius R of object sides and image sides, center thickness of a lens and on-axis distance d between lenses, refractive index nd, Abbe number ν and effective radius of a 1st lens L1 to an 8th lens L8 constituting the camera lens LA according to Embodiment 4. Data in Table 11 includes: conic coefficient k and aspherical coefficient. Data in Table 12 includes: 2ω, f, f1, f2, f3, f4, f5, f6, f7, f8, TTL, IH and TTL/IH.

TABLE 10

|  | R (mm) | d (mm) |  | nd |  | νd | Effective radius (mm) |
|---|---|---|---|---|---|---|---|
| S1 | ∞ | −0.600 |  |  |  |  | 1.800 |
| R1 | 2.3294 | d1 | 1.112 | nd1 | 1.5831 | ν1 59.39 | 1.780 |
| R2 | 7.1824 | d2 | 0.045 |  |  |  | 1.676 |
| STOP | ∞ |  | 0.048 |  |  |  | 1.658 |
| R3 | 7.4766 | d3 | 0.186 | nd2 | 1.6613 | ν2 20.37 | 1.593 |
| R4 | 5.5786 | d4 | 0.211 |  |  |  | 1.485 |
| S2 | ∞ |  | −0.170 |  |  |  | 1.470 |
| R5 | 5.5883 | d5 | 0.180 | nd3 | 1.6509 | ν3 21.52 | 1.471 |
| R6 | 4.3661 | d6 | 0.452 |  |  |  | 1.441 |
| R7 | 7.0778 | d7 | 0.516 | nd4 | 1.5439 | ν4 55.95 | 1.498 |
| R8 | 10.3471 | d8 | 0.367 |  |  |  | 1.640 |
| R9 | 4.8832 | d9 | 0.296 | nd5 | 1.6397 | ν5 23.53 | 1.709 |
| R10 | 3.6660 | d10 | 0.119 |  |  |  | 1.955 |
| R11 | −13.2851 | d11 | 0.308 | nd6 | 1.5439 | ν6 55.95 | 2.043 |
| R12 | −8.8147 | d12 | −0.450 |  |  |  | 2.237 |
| S3 | ∞ |  | 0.566 |  |  |  | 2.240 |
| R13 | 4.9976 | d13 | 0.832 | nd7 | 1.5439 | ν7 55.95 | 2.383 |
| R14 | −2.9782 | d14 | 0.388 |  |  |  | 2.718 |
| R15 | −4.7616 | d15 | 0.311 | nd8 | 1.5352 | ν8 56.12 | 3.125 |
| R16 | 2.3847 | d16 | 0.550 |  |  |  | 3.366 |
| R17 | ∞ | d17 | 0.210 | nd9 | 1.5168 | ν9 64.17 | 3.769 |
| R18 | ∞ | d18 | 0.296 |  |  |  | 3.824 |

TABLE 11

| | Conic coefficient | Aspheric coefficient | | | | | | |
|---|---|---|---|---|---|---|---|---|
| | k | A4 | A6 | A8 | A10 | A12 | A14 | A16 |
| R1 | −3.2002E−01 | −6.3006E−05 | 4.4062E−03 | −4.6779E−03 | 2.8119E−03 | −9.7664E−04 | 1.8349E−04 | −1.9530E−05 |
| R2 | 5.4177E+00 | −6.2847E−02 | 3.0888E−02 | −3.1318E−03 | −4.4276E−03 | 1.8824E−03 | −2.7595E−04 | 9.3832E−06 |
| R3 | 8.7248E+00 | −8.6838E−02 | 5.5050E−02 | −8.0497E−03 | −7.6355E−03 | 4.2099E−03 | −7.3812E−04 | 3.8940E−05 |
| R4 | −3.0008E+00 | −1.0831E−03 | −1.1888E−03 | −6.8025E−04 | 5.0959E−06 | 1.0389E−04 | 4.3959E−05 | −1.8338E−06 |
| R5 | −2.7767E−01 | −2.0554E−04 | −1.1316E−04 | 2.2489E−04 | 6.1961E−05 | −3.1435E−05 | −2.3957E−05 | 7.6194E−06 |
| R6 | 6.4804E+00 | −4.3661E−02 | 3.3309E−02 | −1.8099E−03 | −7.6024E−03 | 3.8871E−03 | −4.5117E−04 | −6.4209E−05 |
| R7 | −4.7211E+01 | −2.3417E−02 | −5.3066E−03 | 1.2943E−02 | −2.3603E−02 | 1.9433E−02 | −7.7933E−03 | 1.2240E−03 |
| R8 | −5.8494E+00 | −5.1658E−02 | 1.6238E−02 | −1.2297E−02 | 2.3488E−03 | 1.4669E−04 | −1.5920E−04 | 1.4715E−05 |
| R9 | −2.8476E+01 | −1.0685E−01 | 4.2145E−02 | −1.8070E−02 | 5.8579E−03 | −2.3672E−03 | 7.0338E−04 | −9.4240E−05 |
| R10 | −2.9030E+01 | −8.5683E−02 | 1.5573E−02 | 2.7165E−03 | −3.7247E−03 | 1.3727E−03 | −2.4959E−04 | 1.9916E−05 |
| R11 | −4.0167E+01 | 1.4037E−03 | −4.9285E−04 | −4.2997E−04 | −1.4370E−04 | −1.0235E−05 | 3.2008E−07 | 1.3252E−06 |
| R12 | 1.0329E+01 | −2.9714E−03 | −2.9786E−04 | −7.9101E−05 | −2.0299E−05 | 2.2319E−06 | 6.6951E−08 | 2.4587E−07 |
| R13 | −2.0959E+01 | −1.8843E−03 | −1.3969E−02 | 5.5633E−03 | −2.0359E−03 | 4.5808E−04 | −5.4058E−05 | 2.7472E−06 |
| R14 | −1.6707E+01 | 1.0566E−02 | 2.2278E−03 | −2.9760E−03 | 7.0156E−04 | −8.0457E−05 | 4.4308E−06 | −8.5182E−08 |
| R15 | −7.8573E−01 | −5.6473E−02 | 1.9916E−02 | −3.5453E−03 | 4.0698E−04 | −2.8635E−05 | 1.1179E−06 | −1.8710E−08 |
| R16 | −1.3690E+01 | −3.5142E−02 | 9.2960E−03 | −1.7846E−03 | 1.9832E−04 | −1.2577E−05 | 4.2831E−07 | −5.5036E−09 |

TABLE 12

| | |
|---|---|
| 2ω (°) | 73.8 |
| Fno | 1.26 |
| f (mm) | 5.142 |
| f1 (mm) | 5.452 |
| f2 (mm) | −34.611 |
| f3 (mm) | −32.591 |
| f4 (mm) | 39.015 |
| f5 (mm) | −25.422 |
| f6 (mm) | 47.020 |
| f7 (mm) | 3.562 |
| f8 (mm) | −2.927 |
| TTL (mm) | 6.374 |
| LB (mm) | 1.056 |
| IH (mm) | 3.928 |
| TTL/IH | 1.623 |

As shown in Table 19, Embodiment 4 satisfies the conditional formulas (1) to (7).

Figure 15:
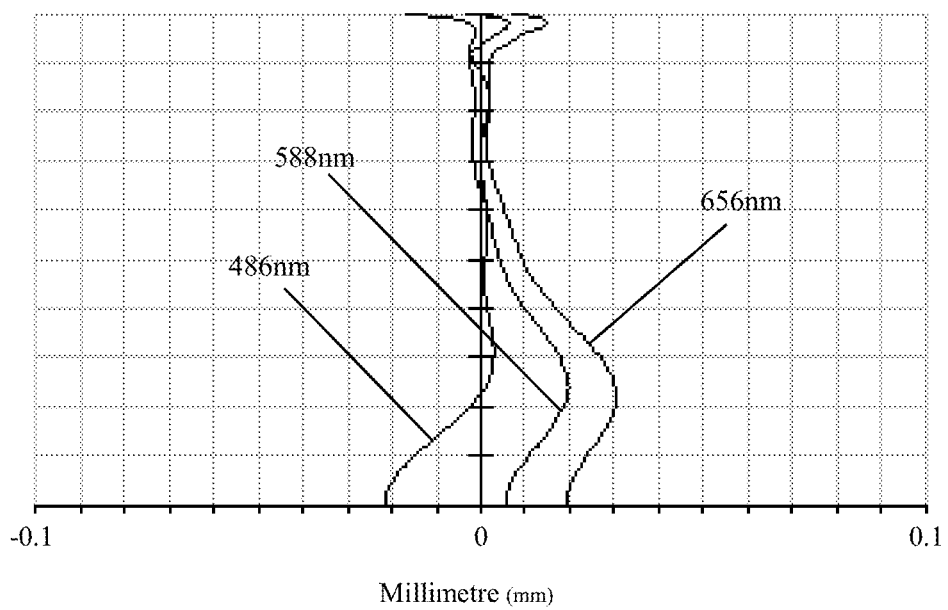
FIG. 15 is an axial aberration diagram of the camera lens LA according to Embodiment 4.
Figure 16:
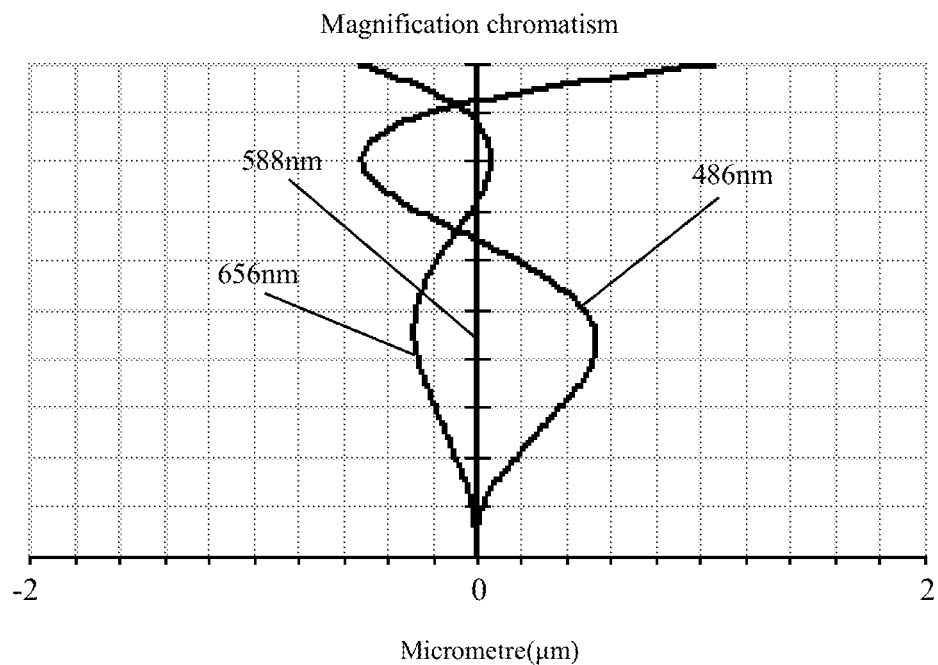
FIG. 16 is a magnification chromatism diagram of the camera lens LA according to Embodiment 4.
Figure 17:
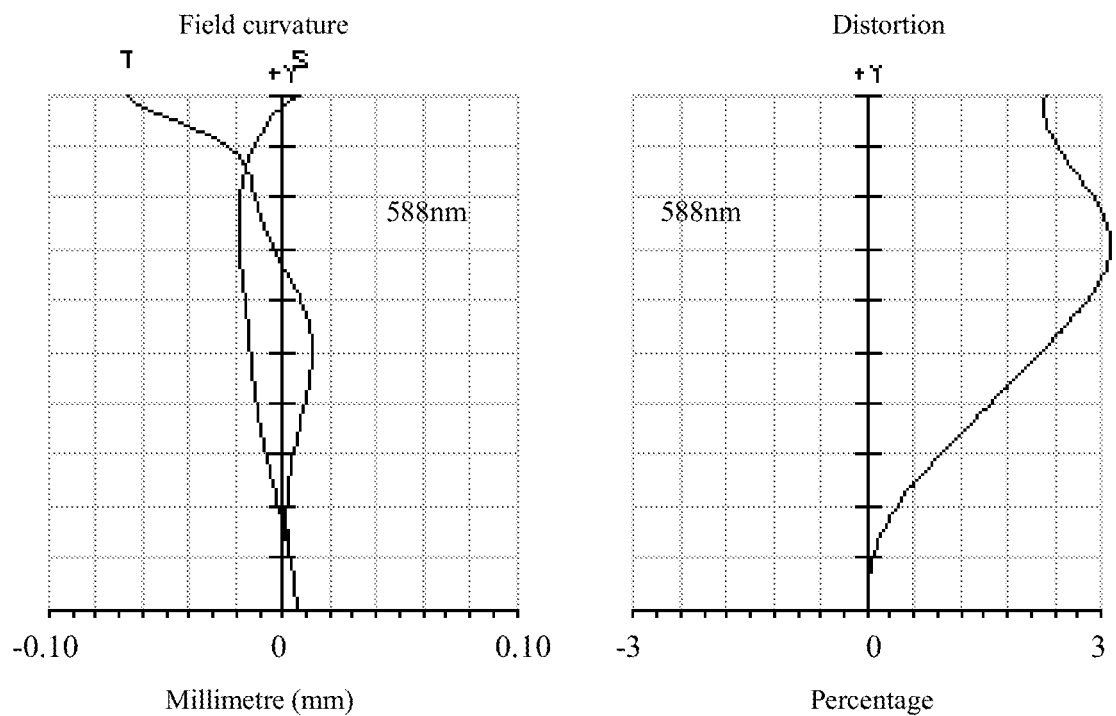
FIG. 17 is a field curvature and distortion diagram of the camera lens LA according to Embodiment 4.

According to the camera lens LA of Embodiment 4, axial aberration is shown in FIG. 15, magnification chromatism is shown in FIG. 16, and field curvature and distortion is shown in FIG. 17. As shown in Table 12, the camera lens LA according to Embodiment 4 has a wide angle, an ultra-thin appearance and a bright Fno, as shown in FIG. 15 to FIG. 17, which makes it not difficult to understand that it has an excellent optical characteristic.

Embodiment 5

Figure 18:
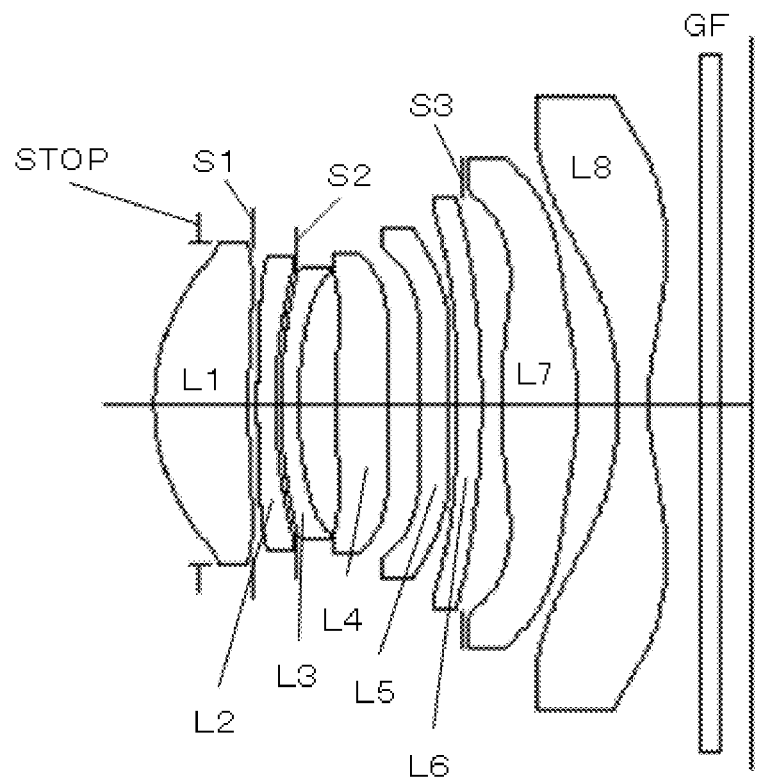
FIG. 18 is a diagram showing configuration of a specific embodiment 5 of the above-described camera lens LA.

FIG. 18 is a diagram showing configuration of a camera lens LA according to Embodiment 5. Data in Table 13 includes: curvature radius R of object sides and image sides, center thickness of a lens and on-axis distance d between lenses, refractive index nd, Abbe number ν and effective radius of a 1st lens L1 to an 8th lens L8 constituting the camera lens LA according to Embodiment 5. Data in Table 14 includes: conic coefficient k and aspherical coefficient. Data in Table 15 includes: 2ω, f, f1, f2, f3, f4, f5, f6, f7, f8, TTL, IH and TTL/IH.

TABLE 13

| | R (mm) | d (mm) | nd | | vd | | Effective radius (mm) |
|---|---|---|---|---|---|---|---|
| STOP | ∞ | −0.480 | | | | | 1.742 |
| R1 | 2.2596 d1 | 0.991 | nd1 | 1.5831 | v1 | 59.39 | 1.742 |
| R2 | 6.6994 d2 | 0.066 | | | | | 1.710 |
| S1 | ∞ | 0.030 | | | | | 1.680 |
| R3 | 7.5614 d3 | 0.191 | nd2 | 1.6613 | v2 | 20.37 | 1.598 |
| R4 | 5.4284 d4 | 0.209 | | | | | 1.487 |
| S2 | ∞ | −0.150 | | | | | 1.480 |
| R5 | 5.8031 d5 | 0.190 | nd3 | 1.6509 | v3 | 21.52 | 1.478 |
| R6 | 4.4714 d6 | 0.394 | | | | | 1.435 |
| R7 | 7.6590 d7 | 0.542 | nd4 | 1.5439 | v4 | 55.95 | 1.447 |
| R8 | 12.6607 d8 | 0.324 | | | | | 1.604 |
| R9 | 5.8684 d9 | 0.307 | nd5 | 1.6397 | v5 | 23.53 | 1.675 |
| R10 | 5.3574 d10 | 0.111 | | | | | 1.903 |
| R11 | −10.9022 d11 | 0.248 | nd6 | 1.5439 | v6 | 55.95 | 2.066 |
| R12 | −10.2802 d12 | −0.200 | | | | | 2.218 |
| S3 | ∞ | 0.412 | | | | | 2.250 |
| R13 | 5.9187 d13 | 0.806 | nd7 | 1.5439 | v7 | 55.95 | 2.314 |
| R14 | −2.8415 d14 | 0.419 | | | | | 2.656 |
| R15 | −5.4221 d15 | 0.321 | nd8 | 1.5352 | v8 | 56.12 | 2.951 |
| R16 | 2.1997 d16 | 0.550 | | | | | 3.303 |
| R17 | ∞ d17 | 0.210 | nd9 | 1.5168 | v9 | 64.17 | 3.712 |
| R18 | ∞ d18 | 0.326 | | | | | 3.771 |

TABLE 14

| | Conic coefficient | Aspheric coefficient | | | | | | |
|---|---|---|---|---|---|---|---|---|
| | k | A4 | A6 | A8 | A10 | A12 | A14 | A16 |
| R1 | −3.2808E−01 | −3.3457E−04 | 4.5148E−03 | −4.6633E−03 | 2.7759E−03 | −9.9589E−04 | 1.7597E−04 | −2.1199E−05 |
| R2 | 4.2124E+00 | −6.4414E−02 | 3.0884E−02 | −3.2310E−03 | −4.4336E−03 | 1.8753E−03 | −2.7836E−04 | 9.0225E−06 |
| R3 | 1.0211E+01 | −8.5320E−02 | 5.5686E−02 | −8.0994E−03 | −7.5478E−03 | 4.2448E−03 | −7.3445E−04 | 3.2933E−05 |
| R4 | −1.1357E+00 | −5.4578E−04 | −6.1643E−04 | −2.5112E−04 | −3.5099E−03 | 4.1237E−05 | 2.7716E−05 | −4.2270E−07 |
| R5 | 3.8518E−01 | 2.0023E−04 | 2.7428E−04 | 6.2523E−05 | −8.4141E−06 | −4.4683E−05 | −1.9285E−05 | −7.5831E−08 |
| R6 | 6.7941E+00 | −3.9701E−02 | 3.3100E−02 | −1.6937E−03 | −7.2391E−03 | 4.1265E−03 | −4.5933E−04 | −1.1072E−04 |
| R7 | −8.2926E+01 | −2.4389E−02 | −3.7177E−03 | 1.3166E−02 | −2.3630E−02 | 1.9384E−02 | −7.8099E−03 | 1.2430E−03 |
| R8 | −5.8433E+01 | −5.2219E−02 | 1.7419E−02 | −1.2080E−02 | 2.3226E−03 | 1.1435E−04 | −1.7127E−04 | 1.0150E−05 |
| R9 | −2.7118E+01 | −1.0495E−01 | 4.2980E−02 | −1.8623E−02 | 5.8470E−03 | −2.2735E−03 | 7.0128E−04 | −1.0443E−04 |
| R10 | −4.5593E+01 | −8.6773E−02 | 1.4984E−02 | 2.8575E−03 | −3.5980E−03 | 1.3924E−03 | −2.4825E−04 | 1.7221E−05 |
| R11 | 1.8450E+00 | −2.0229E−04 | −3.0887E−04 | −7.2986E−05 | −1.3625E−05 | −6.8453E−07 | 1.7365E−07 | 8.9029E−08 |
| R12 | 1.9619E+00 | −5.5564E−04 | −7.3103E−06 | 8.4622E−06 | 1.7391E−06 | −1.2970E−07 | −6.2116E−08 | −1.4933E−08 |
| R13 | −1.2682E+01 | −2.5051E−04 | −1.2610E−02 | 5.4834E−03 | −2.0503E−03 | 4.5322E−04 | −5.4405E−05 | 2.8737E−06 |
| R14 | −1.6217E+01 | 1.5119E−02 | 1.9726E−03 | −3.0493E−03 | 7.0553E−04 | −7.9409E−05 | 4.4579E−06 | −9.2806E−08 |
| R15 | −1.4022E+00 | −5.5740E−02 | 1.9710E−02 | −3.5458E−03 | 4.0766E−04 | −2.8667E−05 | 1.1189E−06 | −1.8965E−08 |
| R16 | −1.2186E+01 | −3.5751E−02 | 9.5477E−03 | −1.7880E−03 | 1.9680E−04 | −1.2596E−05 | 4.2883E−07 | −5.2409E−09 |

TABLE 15

| | |
|---|---|
| 2ω (°) | 75.0 |
| Fno | 1.43 |
| f (mm) | 5.007 |
| f1 (mm) | 5.403 |
| f2 (mm) | −30.200 |
| f3 (mm) | −31.750 |
| f4 (mm) | 34.336 |
| f5 (mm) | −125.717 |
| f6 (mm) | 290.436 |
| f7 (mm) | 3.648 |
| f8 (mm) | −2.884 |
| TTL (mm) | 6.296 |
| LB (mm) | 1.086 |
| IH (mm) | 3.928 |
| TTL/IH | 1.603 |

As shown in Table 19, Embodiment 5 satisfies the conditional formulas (1) to (7).

Figure 19:
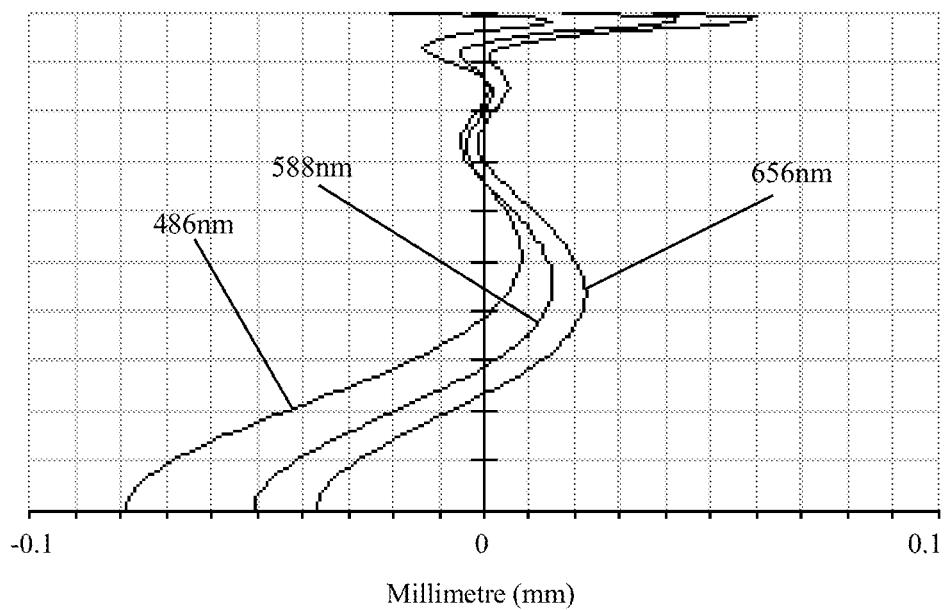
FIG. 19 is an axial aberration diagram of the camera lens LA according to Embodiment 5.
Figure 20:
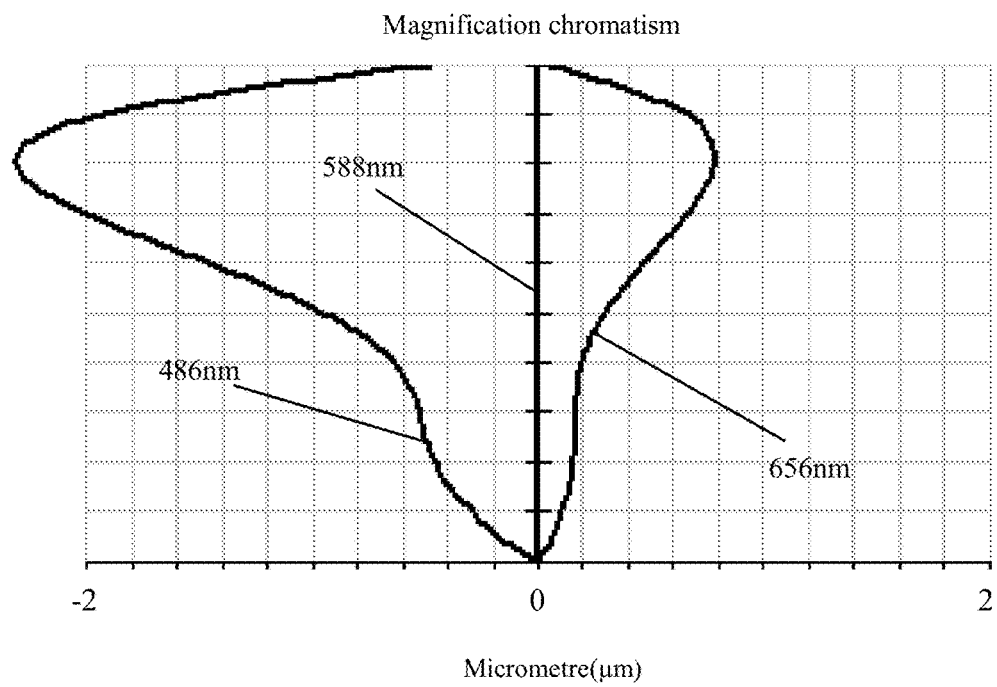
FIG. 20 is a magnification chromatism diagram of the camera lens LA according to Embodiment 5.
Figure 21:
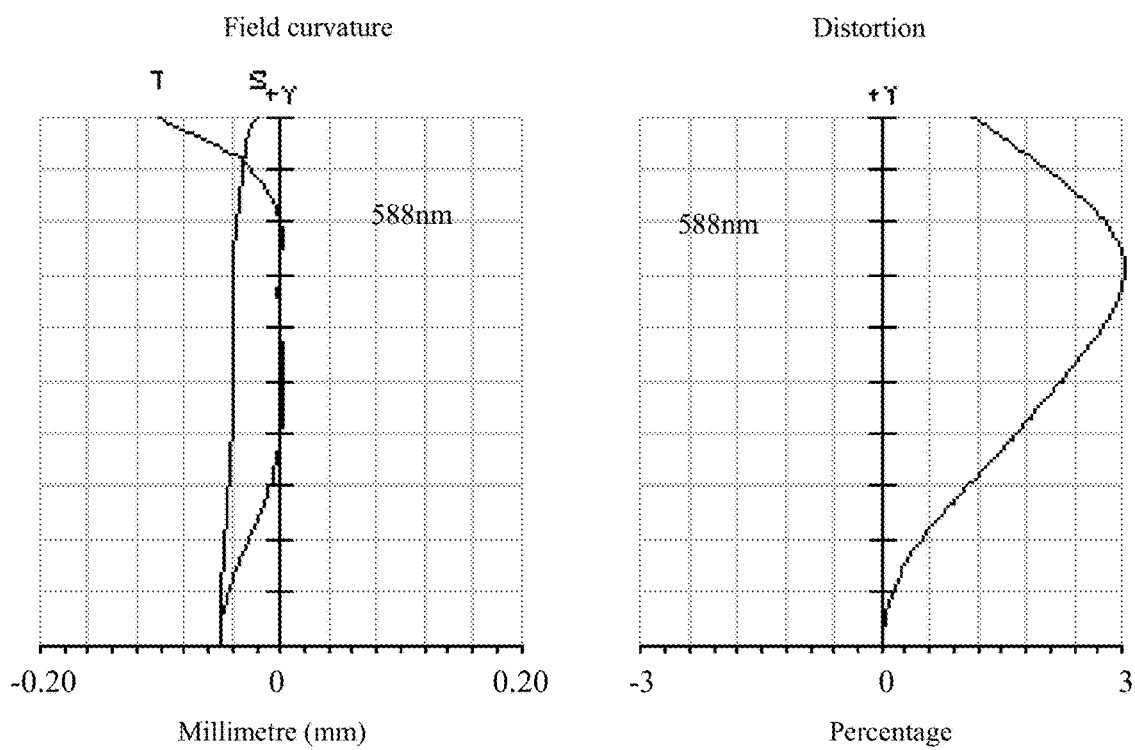
FIG. 21 is a field curvature and distortion diagram of the camera lens LA according to Embodiment 5.

According to the camera lens LA of Embodiment 5, axial aberration is shown in FIG. 19, magnification chromatism is shown in FIG. 20, and field curvature and distortion is shown in FIG. 21. As shown in Table 15, the camera lens LA according to Embodiment 5 has a wide angle, an ultra-thin appearance and a bright Fno, as shown in FIG. 19 to FIG. 21, which makes it not difficult to understand that it has an excellent optical characteristic.

Embodiment 6

Figure 22:
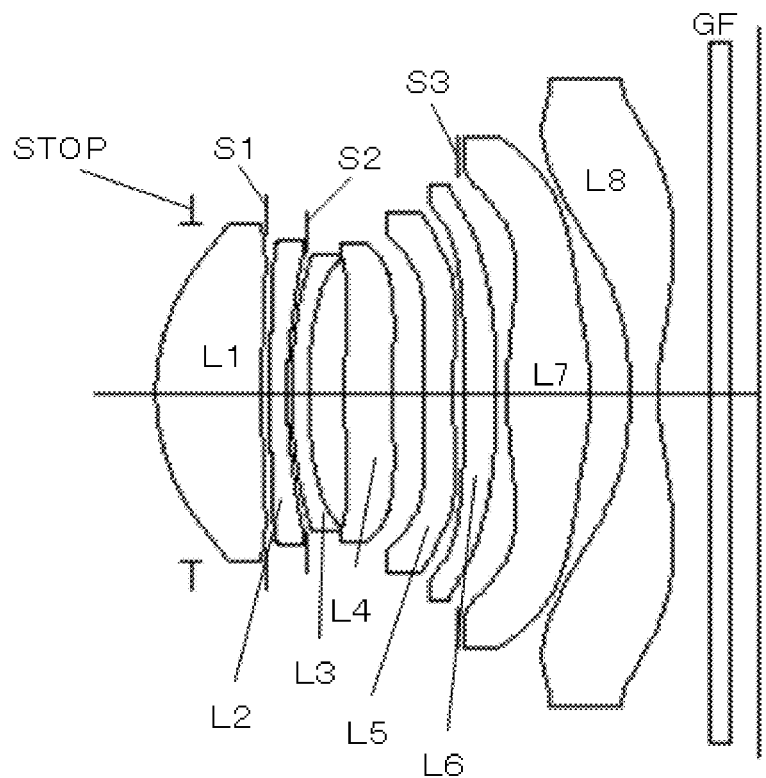
FIG. 22 is a diagram showing configuration of a specific embodiment 6 of the above-described camera lens LA.

FIG. 22 is a diagram showing configuration of a camera lens LA according to Embodiment 6. Data in Table 16 includes: curvature radius R of object sides and image sides, center thickness of a lens and on-axis distance d between lenses, refractive index nd, Abbe number v and effective radius of a 1st lens L1 to an 8th lens L8 constituting the camera lens LA according to Embodiment 6. Data in Table 17 includes: conic coefficient k and aspherical coefficient. Data in Table 18 includes: 2ω, f, f1, f2, f3, f4, f5, f6, f7, f8, TTL, IH and TTL/IH.

TABLE 16

|  | R (mm) | d (mm) | nd |  | vd |  | Effective radius (mm) |
|---|---|---|---|---|---|---|---|
| STOP | ∞ | −0.366 |  |  |  |  | 1.815 |
| R1 | 2.3359 | d1 1.106 | nd1 | 1.5831 | v1 | 59.39 | 1.815 |
| R2 | 7.0937 | d2 0.067 |  |  |  |  | 1.745 |
| S1 | ∞ | 0.020 |  |  |  |  | 1.720 |
| R3 | 7.5568 | d3 0.188 | nd2 | 1.6613 | v2 | 20.37 | 1.657 |
| R4 | 5.6002 | d4 0.197 |  |  |  |  | 1.535 |
| S2 | ∞ | −0.150 |  |  |  |  | 1.529 |
| R5 | 5.5750 | d5 0.175 | nd3 | 1.6509 | v3 | 21.52 | 1.500 |
| R6 | 4.3620 | d6 0.382 |  |  |  |  | 1.467 |
| R7 | 7.2454 | d7 0.513 | nd4 | 1.5439 | v4 | 55.95 | 1.470 |
| R8 | 10.4657 | d8 0.314 |  |  |  |  | 1.620 |
| R9 | 4.5749 | d9 0.313 | nd5 | 1.6397 | v5 | 23.53 | 1.695 |
| R10 | 3.7409 | d10 0.131 |  |  |  |  | 1.955 |
| R11 | −13.2013 | d11 0.334 | nd6 | 1.5439 | v6 | 55.95 | 2.028 |
| R12 | −8.7257 | d12 −0.400 |  |  |  |  | 2.242 |
| S3 | ∞ | 0.512 |  |  |  |  | 2.350 |
| R13 | 5.0605 | d13 0.876 | nd7 | 1.5439 | v7 | 55.95 | 2.481 |
| R14 | −2.9146 | d14 0.417 |  |  |  |  | 2.777 |
| R15 | −4.9041 | d15 0.296 | nd8 | 1.5352 | v8 | 56.12 | 3.213 |
| R16 | 2.3266 | d16 0.550 |  |  |  |  | 3.393 |
| R17 | ∞ | d17 0.210 | nd9 | 1.5168 | v9 | 64.17 | 3.751 |
| R18 | ∞ | d18 0.292 |  |  |  |  | 3.802 |

TABLE 17

| | Conic coefficient | Aspheric coefficient | | | | | | |
|---|---|---|---|---|---|---|---|---|
| | k | A4 | A6 | A8 | A10 | A12 | A14 | A16 |
| R1 | −3.1759E−01 | −1.7714E−04 | 4.5712E−03 | −4.6702E−03 | 2.8094E−03 | −9.7634E−04 | 1.8419E−04 | −1.8887E−05 |
| R2 | 5.4572E+00 | −6.2759E−02 | 3.0983E−02 | −3.0984E−03 | −4.4224E−03 | 1.8809E−03 | −2.7642E−04 | 1.0068E−05 |
| R3 | 7.9826E+00 | −8.6946E−02 | 5.4826E−02 | −8.1725E−03 | −7.6455E−03 | 4.2211E−03 | −7.3445E−04 | 3.5579E−05 |
| R4 | −3.3184E+00 | −1.3430E−03 | −1.3356E−03 | −6.1968E−04 | −3.2452E−07 | 8.4740E−05 | 3.4684E−05 | −1.6651E−06 |
| R5 | 4.9098E−01 | 4.0353E−04 | 1.3610E−04 | 2.4023E−04 | 4.6979E−05 | −3.4144E−05 | −2.5656E−05 | 7.4978E−06 |
| R6 | 6.5709E+00 | −4.3233E−02 | 3.2619E−02 | −1.9041E−03 | −7.5367E−03 | 3.9222E−03 | −4.5301E−04 | −7.8123E−05 |
| R7 | −5.3802E+01 | −2.2954E−02 | −4.8978E−03 | 1.3077E−02 | −2.3608E−02 | 1.9396E−02 | −7.8037E−03 | 1.2456E−03 |
| R8 | −8.4561E+00 | −5.2462E−02 | 1.6801E−02 | −1.2272E−02 | 2.3237E−03 | 1.5849E−04 | −1.5314E−04 | 1.5181E−05 |
| R9 | −2.7612E+01 | −1.0700E−01 | 4.1737E−02 | −1.8185E−02 | 5.9622E−03 | −2.3151E−03 | 7.1050E−04 | −1.0051E−04 |
| R10 | −2.4769E+01 | −8.5294E−02 | 1.5507E−02 | 2.7278E−03 | −3.7018E−03 | 1.3802E−03 | −2.4871E−04 | 1.9242E−05 |
| R11 | −6.4111E+01 | 1.4451E−03 | −9.3484E−04 | −4.9973E−04 | −1.1827E−04 | −3.8044E−06 | 7.1407E−07 | 7.9078E−07 |
| R12 | 1.1430E+01 | −3.7776E−02 | 6.4826E−03 | −6.4149E−05 | −1.2583E−05 | 3.6645E−06 | 1.7854E−07 | 1.9476E−07 |
| R13 | −1.5726E+01 | −1.1901E−03 | −1.3815E−03 | 5.5513E−03 | −2.0389E−03 | 4.5796E−04 | −5.4078E−05 | 2.7391E−06 |
| R14 | −1.7824E+01 | 1.1296E−02 | 2.3607E−03 | −2.9758E−03 | 7.0022E−04 | −8.0417E−05 | 4.4485E−06 | −8.6091E−08 |
| R15 | −5.4955E−01 | −5.6431E−02 | 1.9897E−02 | −3.5420E−03 | 4.0706E−04 | −2.8645E−05 | 1.1176E−06 | −1.8677E−08 |
| R16 | −1.3108E+01 | −3.5820E−02 | 9.4230E−03 | −1.7840E−03 | 1.9782E−04 | −1.2569E−05 | 4.2846E−07 | −5.4982E−09 |

TABLE 18

| | |
|---|---|
| 2ω (°) | 75.4 |
| Fno | 1.35 |
| f (mm) | 4.921 |
| f1 (mm) | 5.502 |
| f2 (mm) | −34.036 |
| f3 (mm) | −32.681 |
| f4 (mm) | 40.991 |
| f5 (mm) | −37.608 |
| f6 (mm) | 46.110 |
| f7 (mm) | 3.537 |
| f8 (mm) | −2.910 |
| TTL (mm) | 6.343 |
| LB (mm) | 1.052 |
| IH (mm) | 3.928 |
| TTL/IH | 1.615 |

As shown in Table 19, Embodiment 6 satisfies the conditional formulas (1) to (7).

Figure 23:
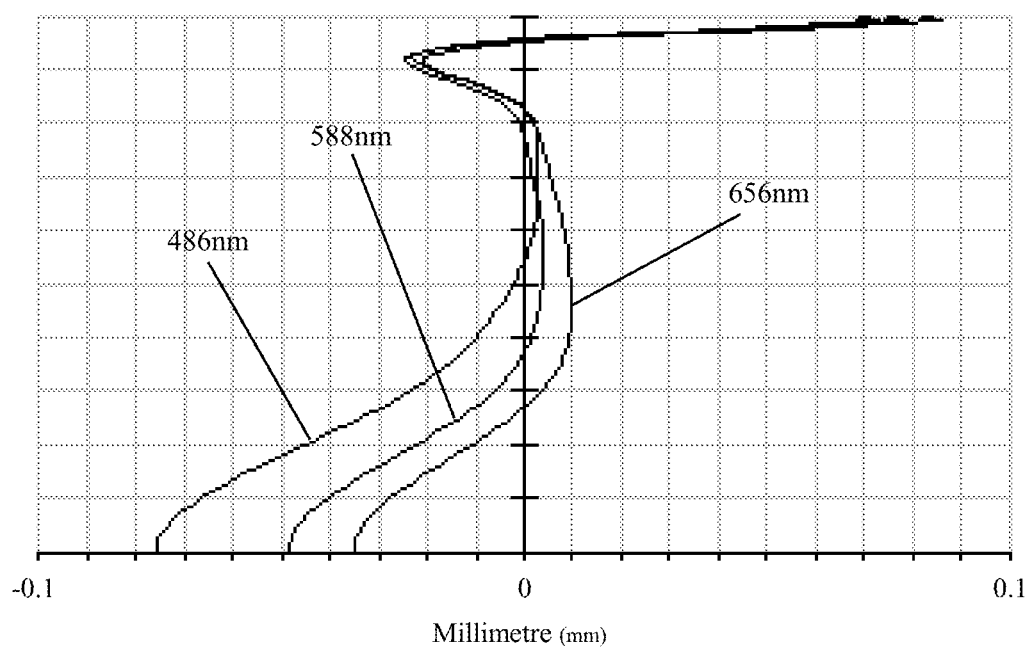
FIG. 23 is an axial aberration diagram of the camera lens LA according to Embodiment 6.
Figure 24:
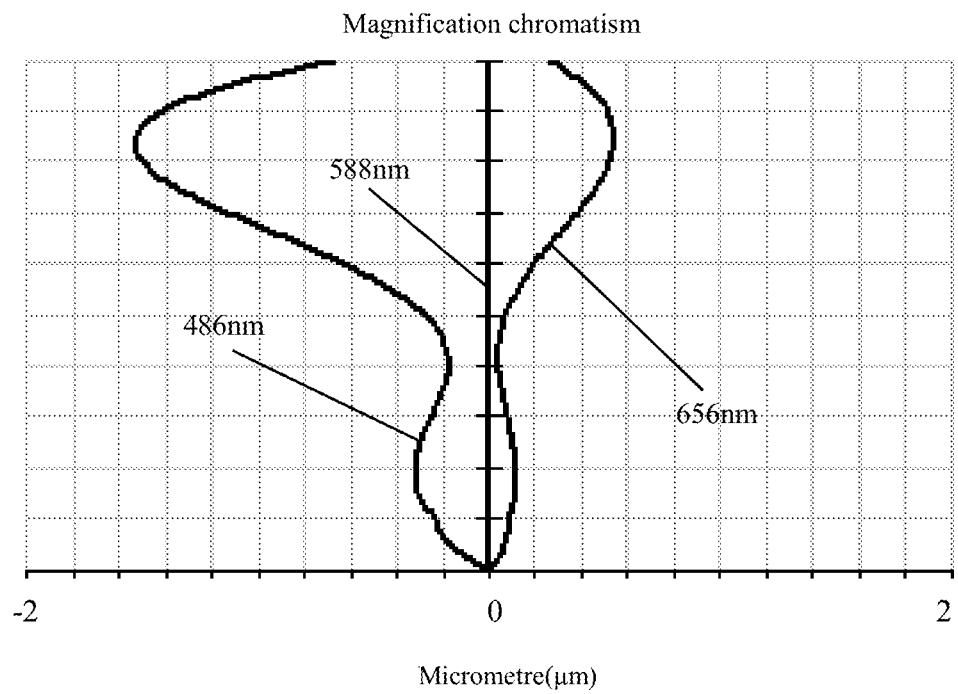
FIG. 24 is a magnification chromatism diagram of the camera lens LA according to Embodiment 6.
Figure 25:
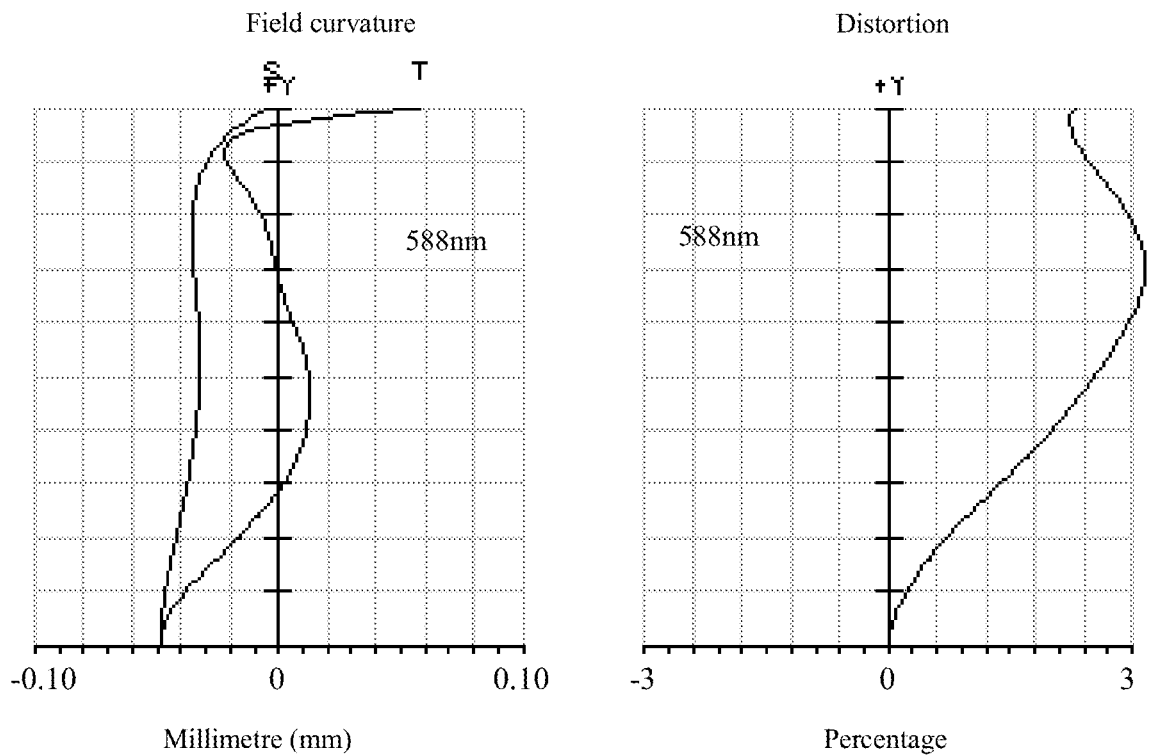
FIG. 25 is a field curvature and distortion diagram of the camera lens LA according to Embodiment 6.

According to the camera lens LA of Embodiment 6, axial aberration is shown in FIG. 23, magnification chromatism is shown in FIG. 24, and field curvature and distortion is shown in FIG. 25. As shown in Table 18, the camera lens LA according to Embodiment 6 has a wide angle, an ultra-thin appearance and a bright Fno, as shown in FIG. 23 to FIG. 25, which makes it not difficult to understand that it has an excellent optical characteristic.

Table 19 presented later on shows a variety of numerical of each of Embodiment 1 to Embodiment 6 and values corresponding to parameters specified in conditional formulas (1) to (7) according to Embodiment 1 to Embodiment 6.

TABLE 19

|  | Embodiment 1 | Embodiment 2 | Embodiment 3 | Embodiment 4 | Embodiment 5 | Embodiment 6 |  |
| --- | --- | --- | --- | --- | --- | --- | --- |
| R1/R2 | 0.326 | 0.316 | 0.328 | 0.324 | 0.337 | 0.329 | Conditional formula (1) |
| R3/R4 | 1.342 | 1.351 | 1.349 | 1.340 | 1.393 | 1.349 | Conditional formula (2) |
| f1/f | 1.057 | 1.075 | 1.061 | 1.060 | 1.079 | 1.118 | Conditional formula (3) |
| f2/f | −6.677 | −6.737 | −6.583 | −6.731 | −6.032 | −6.916 | Conditional formula (4) |
| f3/f | −6.264 | −6.294 | −6.224 | −6.338 | −6.342 | −6.641 | Conditional formula (5) |
| R13/R14 | −1.795 | −1.275 | −1.813 | −1.678 | −2.083 | −1.736 | Conditional formula (6) |
| R15/R16 | −2.006 | −1.854 | −2.010 | −1.997 | −2.465 | −2.108 | Conditional formula (7) |

The scope of the present disclosure is not limited to the above-described embodiments, and any ordinarily skilled in the art, within the content disclosed by the present disclosure, may make equivalent modifications or variations, which should be covered within the protection scope of the claims.

What is claimed is:

1. A camera lens, configured with, sequentially from an object side: a 1st lens having a positive refractive power, a 2nd lens having a negative refractive power, a 3rd lens having a negative refractive power, a 4th lens having a positive refractive power, a 5th lens having a negative refractive power, a 6th lens having a positive refractive power, a 7th lens having a positive refractive power and an 8th lens having a negative refractive power, and satisfying conditional formulas (1) to (2) and (4) below:

$$0.20 \leq R1/R2 \leq 0.50 \quad (1);$$

$$1.00 \leq R3/R4 \leq 1.40 \quad (2);$$

$$-8.00 \leq f2/f \leq -5.00 \quad (4);$$

where,
f: a focal length of the overall camera lens;
f2: a focal length of the 2nd lens;
R1: a curvature radius of an object side surface of the 1st lens;
R2: a curvature radius of an image side surface of the 1st lens;
R3: a curvature radius of an object side surface of the 2nd lens;
R4: a curvature radius of an image side surface of the 2nd lens.

2. The camera lens according to claim 1, wherein the camera lens satisfies a conditional formula (3) below:

$$1.00 \leq f1/f \leq 1.50 \quad (3);$$

where,
f: a focal length of the overall camera lens;
f1: a focal length of the 1st lens.

3. The camera lens according to claim 1, wherein the camera lens satisfies a conditional formula (5) below:

$$-8.00 \leq f3/f \leq -5.00 \quad (5);$$

where,
f: the focal length of the overall camera lens;
f3: a focal length of the 3rd lens.

4. The camera lens according to claim 1, wherein the camera lens satisfies a conditional formula (6) below:

$$-3.00 \leq R13/R14 \leq -1.00 \quad (6);$$

where,
R13: a curvature radius of an object side surface of the 7th lens;
R14: a curvature radius of an image side surface of the 7th lens.

5. The camera lens according to claim 1, wherein the camera lens satisfies a conditional formula (7) below:

$$-3.00 \leq R15/R16 \leq 1.00 \quad (7);$$

where,
R15: a curvature radius of an object side surface of the 8th lens;
R16: a curvature radius of an image side surface of the 8th lens.

* * * * *